(12) United States Patent
Tesanovic et al.

(10) Patent No.: US 11,665,746 B2
(45) Date of Patent: May 30, 2023

(54) HANDLING COLLISIONS IN WIRELESS NETWORKS

(71) Applicant: Samsung Electronics Co., Ltd., Suwon-si (KR)

(72) Inventors: Milos Tesanovic, Staines (GB); Soenghun Kim, Suwon-si (KR); Jaehyuk Jang, Suwon-si (KR); Yinan Qi, Staines (GB); Mythri Hunukumbure, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 17/264,113

(22) PCT Filed: Aug. 7, 2019

(86) PCT No.: PCT/KR2019/009911
§ 371 (c)(1),
(2) Date: Jan. 28, 2021

(87) PCT Pub. No.: WO2020/032591
PCT Pub. Date: Feb. 13, 2020

(65) Prior Publication Data
US 2021/0315023 A1  Oct. 7, 2021

(30) Foreign Application Priority Data

Aug. 8, 2018 (GB) ...................................... 1812914
Aug. 9, 2018 (GB) ...................................... 1812978

(51) Int. Cl.
*H04W 74/08*  (2009.01)
*H04L 1/18*  (2006.01)
(Continued)

(52) U.S. Cl.
CPC ....... *H04W 74/0841* (2013.01); *H04L 1/1819* (2013.01); *H04W 72/10* (2013.01);
(Continued)

(58) Field of Classification Search
None
See application file for complete search history.

(56) References Cited

U.S. PATENT DOCUMENTS 8,295,236 B2  10/2012  Ishii et al.
8,296,616 B2  10/2012  Wu
(Continued)

FOREIGN PATENT DOCUMENTS

EP  2 129 150 A1  12/2009
EP  2 180 749 A1  4/2010
(Continued)

OTHER PUBLICATIONS

Extended European Search Report dated Aug. 17, 2021, issued in European Patent Application No. 19846115.4.
(Continued)

*Primary Examiner* — Jutai Kao
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Described is a method of operating a mobile terminal in a wireless communications network, the mobile
(Continued)

terminal being arranged to communicate with a base station, the method comprising: one or more of: determining a cause of the Random Access procedure initiation following initiation of a Random Access procedure; and determining one or more transmission priority factors indicating an operating parameter of the network; and based on one or more of the determined cause of Random Access procedure initiation and the determined one or more transmission priority factors, performing one of: prioritising Random Access signal transmission over signal transmission on the uplink shared channel; prioritising signal transmission on the uplink shared channel over Random Access signal transmission; or making no change to the existing signal transmission protocol. Also described is a method of operating a base station in in a wireless communications network, the base station being arranged to communicate with a mobile terminal, the method comprising determining a prioritisation action for the mobile terminal to perform based on one or more of a determined indication and a received indication from the mobile terminal. Also described is a method and apparatus for signalling for group handover or cell re-selection in non-terrestrial networks.

14 Claims, 13 Drawing Sheets

(51) Int. Cl.
  *H04W 72/12* (2009.01)
  *H04W 72/14* (2009.01)
  *H04W 72/10* (2009.01)
  *H04L 1/1812* (2023.01)
  *H04W 72/1263* (2023.01)
(52) U.S. Cl.
  CPC ... *H04W 72/1242* (2013.01); *H04W 72/1263* (2013.01); *H04W 72/14* (2013.01)

(56) References Cited

U.S. PATENT DOCUMENTS

| | | |
|---|---|---|
| 8,411,626 B2 | 4/2013 | Kuo |
| 2010/0172299 A1 | 7/2010 | Fischer et al. |
| 2014/0040694 A1 | 2/2014 | Verma et al. |
| 2014/0321389 A1* | 10/2014 | Zhang .................. H04W 52/28 370/329 |
| 2014/0373124 A1 | 12/2014 | Rubin et al. |
| 2015/0146632 A1 | 5/2015 | Wu et al. |
| 2017/0019799 A1 | 1/2017 | Djordjevic et al. |
| 2017/0135135 A1 | 5/2017 | Pelletier et al. |
| 2017/0208512 A1 | 7/2017 | Aydin et al. |
| 2018/0035472 A1 | 2/2018 | Hwang et al. |
| 2018/0124687 A1 | 5/2018 | Park et al. |
| 2018/0352582 A1* | 12/2018 | Yi ..................... H04W 72/1257 |
| 2019/0173740 A1* | 6/2019 | Zhang ..................... H04L 43/08 |
| 2019/0289638 A1* | 9/2019 | Kung .................... H04W 28/04 |
| 2019/0349061 A1* | 11/2019 | Cirik ..................... H04L 1/1858 |
| 2020/0122830 A1 | 4/2020 | Anderson et al. |
| 2020/0178263 A1* | 6/2020 | Shao ................. H04W 74/0833 |
| 2020/0196327 A1* | 6/2020 | Zhang ............... H04W 28/0268 |

FOREIGN PATENT DOCUMENTS

| | | | |
|---|---|---|---|
| EP | 2 383 923 | A1 | 11/2011 |
| EP | 2 978 258 | A1 | 1/2016 |
| EP | 3 540 999 | A1 | 9/2019 |
| KR | 10-2018-0049800 | A | 5/2018 |
| WO | 2013/168137 | A2 | 11/2013 |
| WO | 2017/165854 | A2 | 9/2017 |

OTHER PUBLICATIONS

'3GPP; TSGRAN; NR; Radio Resource Control (RRC) protocol specification (Release 15)', 3GPP TS 38.331 V15.2.1, Jun. 21, 2018.
'3GPP; TSGRAN; NR; Medium Access Control (MAC) protocol specification (Release 15)', 3GPP TS 38.321 V15.2.0, Jun. 20, 2018.
ASUSTeK, Handling configuredGrantTimer during Random Access Procedure, 3GPP TSG-RAN WG2 Meeting #AH-1807; R2-1809504; Jul. 2-6, 2018, Montreal, Canada.
British Exam Report dated Feb. 6, 2019, issued in British Patent Application No. GB1812914.8.
British Combined Search and Examination Report dated Feb. 11, 2019, issued in British Patent Application No. GB1812978.3.
British Exam Report dated Dec. 14, 2020, issued in British Patent Application No. GB1812914.8.

* cited by examiner

HANDLING COLLISIONS IN WIRELESS NETWORKS

TECHNICAL FIELD

Certain embodiments of the present invention provide methods, apparatus and systems for handling signal collisions in a wireless communication system. For example, certain embodiments provide methods, apparatus and systems for providing a way of handling signal collisions in millimetre wave communications in 3rd Generation Partnership Project (3GPP) 5th Generation (5G) New Radio (NR) systems. Certain embodiments provide methods, apparatus and systems for handling collisions between Random Access (RA) Message 3 (Msg3) signals and Configured Grant (CG) signals. Certain embodiments provide methods, apparatus and systems for handling collisions between Random Access (RA) Message 3 (Msg3) signals and Dynamic Grant (DG) signals.

This invention also relates generally to implementing signalling techniques in a non-terrestrial network (NTN), and in particular, but not limited to, supporting handover of a group of active users in NTNs.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

Wireless or mobile (cellular) communications networks in which a mobile terminal (or user equipment, UE, such as a mobile handset) communicates via a radio link with a network of base stations or other wireless access points connected to a telecommunications network, have undergone rapid development through a number of generations. Second Generation (2G) digital systems such as Global System for Mobile communications (GSM) have been largely replaced or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by the $3^{rd}$ Generation Partnership Project (3GPP). 3GPP design, specify and standardise technologies for mobile wireless communications networks. Fourth Generation (4G) systems are now widely deployed to provide greater throughput of data. 3GPP standards for 4G systems including an Evolved Packet Core (EPC) and an Enhanced-UTRAN (E-UTRAN) radio access network. The E-UTRAN uses Long Term Evolution (LTE) radio technology, which offers potentially greater capacity and additional features compared with previous standards. LTE is commonly used to refer to the whole system including both the EPC and the E-UTRAN. LTE Advanced is defined by 3GPP standards releases from 3GPP Release 10 and considered to be a 4G mobile communication system by the International Telecommunication Union (ITU).

The trend towards greater data throughput continues with current research to develop Fifth Generation (5G) network technologies. While the form that 5G networks may take is not fully defined, it is probable that 5G networks will include the capacity to provide extremely high data rates to mobile users in relatively compact geographical areas. To meet the continually increasing demand for higher data rates and higher volumes of data transmitted through wireless communication systems, one option is to use a wider frequency band, such as may be available in the Extremely High Frequency (EHF) band (roughly in the 30-300 GHz range). Radio waves in this band range from 10 mm to 1 mm and so the band is sometimes referred to as the millimetre band or millimetre wave (mm-wave).

In the Open Systems Interconnection (OSI) model of computer networking, it is the physical layer which translates logical communication requests from the data link layer into hardware-specific operations to cause transmission or reception of electronic signals. In 4G and 5G communications, the physical layer sends a transport block to start the Hybrid Automatic Repeat Request (HARQ) procedure for that block. HARQ is a combination of high-rate forward error-correcting code and ARQ error-control. In a HARQ procedure, as one signal is transmitted, the signal is buffered and for this particular HARQ process nothing else can be buffered. Several of these procedures may be run in parallel to prevent stalling and allow transmission of parallel HARQ signals. Even if the signals are delivered out of sequential order, higher layers can re-order the packets sequentially.

HARQ processes have ID numbers. Number #0 is a special case because this HARQ process is used by Random Access (RA) procedures. In one scenario discussed in relation to FIGS. 1a and 1b, an RA signal (e.g. from a base station to a mobile terminal) is transmitted to initiate communications (for example, there may have been a detected communications loss due to beam failure). FIGS. 1a and 1b show the HARQ buffer of process 0 (p0) 102, 122 and the Msg3 buffer 104, 124.

FIG. 1a illustrates an example of a conflict 100 between transmitting a HARQ p0 signal as part of an uplink shared channel (UL-SCH) transmission, such as part of a Configured Grant (CG) or Dynamic Grant (DG) process, and transmitting the corresponding Msg3 signal. This may be part of a New Radio (NR) procedure (NR is specific to 5G). CG is a system by which resources are periodically allocated, and is based on the LTE semi-persistent scheduling (SPS) scheme. Multiple devices may share the periodic resources (e.g. two devices may each use the CG resources to transmit messages, and data to be transmitted by each device is transmitted in the next upcoming allocated slot following generation of the data).

In FIG. 1a RA commences by the mobile terminal sending the preamble required for initiating communications 105. The network transmits a RAR in response 106. Next, a new UL-SCH transmission for HARQ p0 is transmitted 108. The terminal then sends a Message 3, Msg3 110 (this is the portion of the message which contains the actual data to be transmitted, e.g. the body of the message). If, as shown, there is a ULSCH transmission for HARQ p0 108 between the RAR 106 and the corresponding Msg3 transmission 110, as shown in FIG. 1, then the Medium Access Control (MAC) Protocol Data Unit (PDU) #1 112 for transmission via the UL-SCH transmission 108 will be overwritten by the MAC PDU #2 114, 116 for Msg3 shortly after the first transmission 108, with hardly any retransmission chances. If the MAC PDU #1 data relating to the UL-SCH transmission process is overwritten, then it cannot be retransmitted. It may be that the first transmission 108 via the UL-SCH transmission would then not succeed if the RA procedure is triggered, for example, for beam failure recovery.

In other words, if there is a UL-SCH transmission occasion 108 associated with HARQ p0 between reception of RAR 106 and transmission of Msg3 110, Msg3 114, 116 would overwrite the UL-SCH transmission data 112 in the HARQ p0 transmission buffer 102. The Msg3 buffer 104 is a separate entity from the HARQ p0 transmission buffer, but after the first transmission of Msg3 110, data 114, 116 will be moved from the Msg3 buffer to the HARQ buffer 102.

FIG. 1b illustrates an example of a conflict 120 between transmitting a HARQ p0 signal as part of a UL-SCH transmission process such as CG or DG, and transmitting and retransmitting the corresponding Msg3 signal. In FIG. 1b a RAR is transmitted 126 by the network to the mobile device in response to a RA from the mobile terminal to send the preamble required for initiating communications as in FIG. 1a (not shown in FIG. 1b). The mobile terminal transmits Msg3 132 in response. Then there is a new UL-SCH transmission for HARQ p0 136 immediately after Msg3 transmission 132. The UL-SCH transmission 136 following the Msg3 transmission 132 causes the MAC PDU #2 128, 130 for Msg3, which has moved from the Msg3 buffer 124 to the HARQ buffer p0 122, to be overwritten by the MAC PDU #3 134 for the UL-SCH transmission HARQ p0 transmission. If the MAC PDU #2 data relating to the Msg3 transmisssion is overwritten, then the Msg3 data cannot be transmitted as intended.

In other words, if there is a UL-SCH transmission for HARQ p0 136 between Msg3 new transmission 132 and Msg3 retransmission 142, MAC PDU #2 for Msg3 128, 130 will be overwritten by MAC PDU #3 134 transmitted via the UL-SCH transmission HARQ p0 process 136 shortly after the first transmission of Msg3 132. For the first transmission of Msg3 132, MAC PDU #2 data 128, 130 will be moved to the HARQ buffer 122 from the Msg3 buffer 124, but then would be overwritten by the MAC PDU #3 data 134 for the UL-SCH transmission process 136. Further, it is unclear what would be transmitted 142 by the UE if uplink grant for Msg3 retransmission 138 (i.e. addressed to Temporarily Cell-Radio Network Temporary Identity C-RNTI) is received because the MAC PDU #2 data 130 for Msg3 transmission was overwritten by the MAC PDU #3 data 134, 140 for the UL-SCH transmission process.

Thus, there is a problem in the art that the RA procedure (for example following beam failure) may be interrupted by UL-SCH transmission, and that UL-SCH transmission may be interrupted by the RA procedure (that is, UL-SCH transmissions may not be given enough retransmission chances).

Similar problems may occur in a NR system (in a 5G system) involving CG, and in LTE (4G) when uplink SPS or dynamic grant (DG) is allocated the same subframe where Msg3 transmission/retransmission is scheduled. Configured Grant and Dynamic Grant signal transmissions may both be considered as signal transmissions which take place on the uplink shared channel (UL-SCH).

There are possible solutions for this problem proposed in 3GPP discussions, but they do not take into account the reason behind RA. There may be several possible reasons to perform RA in a 5G NR system. For example, when RA is performed due to lack or unavailability of Physical Uplink Control Channel (PUCCH) resources on a single Scheduling Request (SR) configuration (this scenario is relevant in 5G communications where parallel SR and RA may take place), there is some rationale to solve this problem because the link quality may well be satisfactory, and avoiding data loss makes technical sense. That is, it may not be the best approach, especially in 5G networks, to assume that RA is required due to beam failure and to prioritise that by transmitting RA requests, because other scenarios are possible in which beam failure is not an issue, and data transmission including CG transmissions may be better prioritized in such cases.

In the prior art, solutions focus on the case where a UE needs to perform RA (e.g. for beam failure recovery) when it is configured with a configured uplink grant. The reasoning behind this might be that, even though beam failure recovery is in process, ongoing CG or DG can still continue (beam failure is not the same as link failure). In the prior art, therefore, the cause of the RA is not taken into account, and the approach focuses on addressing beam failure.

Accordingly, what is desired is a technique for ensuring appropriate transmissions are made in the event of RA processes in 4G and 5G communication networks, to reduce data loss from buffer data being overwritten, for example due to collisions between CG or DG and Msg3 RA signals.

The above information is presented as background information only to assist with an understanding of the present disclosure. No determination has been made, and no assertion is made, as to whether any of the above might be applicable as prior art with regard to the present invention.

In recent years, third generation (3G) wireless communications have evolved to the long term evolution (LTE) cellular communication standard, sometimes referred to as 4th generation (4G) wireless communications. Both 3G and 4G technologies are compliant with third generation partnership project (3GPP™) standards. 4G networks and phones were designed to support mobile internet and higher speeds for activities, such as video streaming and gaming. The 3GPP™ standards are now developing a fifth generation (5G) of mobile wireless communications, which is set to initiate a step change in the delivery of better communications, for example powering businesses, improving communications within homes and spearheading advances such as driverless cars.

Referring to FIG. 5, a known simplified 5G architecture diagram 1100 illustrates a first terrestrial 5G base station 1102 supporting communications within a coverage area 1104, including communication support for a wireless communication unit, sometimes referred to as a terminal device, such as a user equipment UE 1106. In 5G, the UE 1106 is able to support traditional Human Type Communications (HTC) or the new emerging Machine Type Communications (MTC). The UE 1106 is considered to be active when communicating and in the operational state technically known as radio resource control (RRC) connected, or the UE is considered to be in the new 5G-new radio (NR) defined 'RRC-inactive' state. The known simplified architecture diagram 1100 comprises a second terrestrial 5G base station 1112 supporting communications within a coverage area 1114, including communication support for the UE 1106 as it transitions to the second terrestrial 5G base station 1112 coverage area 1114. A backhaul connection 1122, generally an Xn (based on X2) interface that specifies some additional procedures for coordinating aspects relevant for handover, connects the first terrestrial 5G base station 1102 and second terrestrial 5G base station 1112 via a gateway 1120. For the RRC-inactive state UEs, a cell re-selection process is warranted, if the signal strength from the current serving cell deteriorates as the UE transitions from 5G base station 1102 to 1112.

Currently, a handover between base stations is performed when a UE 1106 approaches a cell edge, i.e. at the edge of the coverage area 1104 from first terrestrial 5G base station 1102. Handover of the active communication from the first terrestrial 5G base station 1102 to the second terrestrial 5G base station 1112 happens when the measured signal strength (as measured by the UE 1106) of the second base station 1112 becomes a Δ dB higher than the signal strength of serving base station 1102, to avoid an instantaneous decision that would have to be reversed soon thereafter based on similar signal strength measurements. The effect of a communication being handed over between two base stations too frequently is typically referred to as a 'ping-pong' handover effect.

Similarly a cell re-selection process is performed for 'RRC inactive' state UEs when the UE nears the cell edge of the current 5G base station 1102 that it is camped on, and is able to receive a signal from the neighbour base station 1112. This known 5G cell reselection process is also driven by signal strength measurements of the base stations carried out by the UE. Again, a Δ dB threshold is enacted to avoid repeated cell reselections in a 'ping-pong' effect.

Thus, the 3GPP NR (and LTE) handover and cell re-selection procedures are governed by the measurement reports that the UE 1106 is providing of signals received from serving base station 1102 and one or more neighbour base station(s) 1112, sometimes referred to as fifth generation Node Bs (gNB) or eNBs. These measurement reports can be periodic or instructed by the serving gNB 1102 and the UE 1106 can report a number of neighbour gNB (or eNB) signal strengths that is/are above a threshold. The threshold Δ dB is set to avoid ping-pong type handover and cell reselection exchanges near the cell border, as the instantaneous signal strengths can very dynamically. The serving gNB 1102 can instruct each individual UE 1106 to provide these measurement reports and the measurement frequency can be adapted depending on whether a particular UE is nearing a cell edge, for example. The serving gNB 1102 will initiate the handover process on an individual UE basis, if the serving gNB signal strength is below (with threshold considered) a reported neighbour gNB signal strength. In this regard, unicast messages are sent from the serving gNB 1102 to each UE 1106 to initiate a normal, individual handover operation. Each of these respective handovers is based on the individual UE 1106 measurement reports identifying the signal strength of transmissions from gNBs that it can 'see'. Also, the cell re-selection processes happen on an individual UE basis, based on the measurements of the current camped-on and neighbour base stations (gNBs). In the 'RRC-inactive' state, the current camped-on base station (gNB) 1102 is able to instruct the UEs 1106 on an individual basis in order to carry out these measurements and the UE 106 themselves will initiate and carry out the cell re-selection process.

Another instance where a wireless communication unit/UE 1106 may need to transition to being supported by a neighbour gNB is when its serving gNB fails. In this case, the wireless communication unit/UE 1106 must undergo re-registration process with the (new) neighbour gNB in order to re-start communications.

Non-Terrestrial Networks (NTNs) is an emerging area in 3GPP™ discussions for 5G, where a study item recently concluded in 5G RAN1, and a 5G RAN2 study item is proposed to start in August 2018. Non-Terrestrial Networks aim to provide 5G cellular coverage using space borne and/or air borne platforms, where traditional ground based networks have difficulty in providing coverage and/or capacity. FIG. 6 illustrates the link configuration 1200 currently envisioned for 5G air-borne communications. As illustrated, an air-borne platform (5G base station 220 employs a service link 1215 to a handheld or Internet of Things (IoT-similar to MTC) device 1210, whilst facilitating communications via a feeder link 1225 to a 5G gateway 1230, and thereafter the 5G core network 1240 and a public data network 1250, such as the Internet.

Particularly with air-borne platforms (such as High Altitude Platforms (HAPs) or drones), there will be a need to replace a single active airship or drone with another, for example due to battery power draining or maintenance reasons. In this scenario, the group of active users that the current airship or drone is supporting will need to be handed over to the replacement airship or drone in a quick and efficient manner. The current 5G new radio (NR) and LTE standards do not have provisions for such an accelerated group handover or cell re-selection procedures.

Hence, the inventors have identified a problem with extrapolating the above mentioned 'terrestrial' handover and cell re-selection approaches, when considering a non-terrestrial network implementation, in that a NTN base station will need to be wholly replaced whilst actively handling many active users, and likely more frequently as airborne battery supplies will run down and/or for maintenance reasons. Furthermore, hot switch-over techniques for a fully-functioning terrestrial base station to be switched in, or gradually switched over to, is unsuitable in an NTN scenario.

Solution to Problem

The present invention is defined in the independent claims. Advantageous features are defined in the dependent claims.

According to an aspect, there is provided a method of operating a mobile terminal in a wireless communications network, the mobile terminal being arranged to communicate with a base station, the method comprising:
one or more of:
determining a cause of the Random Access procedure initiation following initiation of a Random Access procedure; and
determining one or more transmission priority factors indicating an operating parameter of the network; and
based on one or more of the determined cause of Random Access procedure initiation and the determined one or more transmission priority factors, performing one of:
prioritising Random Access signal transmission over signal transmission on the uplink shared channel;
prioritising signal transmission on the uplink shared channel over Random Access signal transmission; or
making no change to the existing signal transmission protocol.

According to an aspect of the present invention, there is provided a method of operating a mobile terminal in a wireless communications network, the mobile terminal being arranged to communicate with a base station, the method comprising: following initiation of a Random Access procedure, determining a cause of the Random Access procedure initiation; and based on the determined cause, performing one of: prioritising Random Access signal transmission over signal transmission on the uplink shared channel; prioritising signal transmission on the uplink shared channel over Random Access signal transmission; or making no change to the existing signal transmission protocol.

According to an aspect of the present invention, there is provided a method of operating a base station in a wireless communications network, the base station being arranged to communicate with a mobile terminal, the method comprising one or more of: determining a cause of the Random Access procedure initiation following initiation of a Random Access procedure, and receiving, from the mobile terminal, an indication of a cause of the Random Access procedure initiation following initiation of a Random Access procedure; based on the one or more determined causes and received indications, determining a prioritisation action for the mobile terminal to perform from: prioritising Random Access signal transmission over signal transmission on the uplink shared channel; prioritising signal transmission on the uplink shared channel over Random Access signal transmission; or making no change to the existing signal transmission protocol; and providing an indication of the prioritisation action to the mobile terminal.

According to an aspect of the present invention, there is provided a method of operating a mobile terminal in a wireless communications network, the mobile terminal being arranged to communicate with a base station, the method comprising: determining one or more transmission priority factors indicating an operating parameter of the network; and based on the determined one or more transmission priority factors, performing one of: prioritising Random Access signal transmission over signal transmission on the uplink shared channel; prioritising signal transmission on the uplink shared channel over Random Access signal transmission; or making no change to the existing signal transmission protocol.

According to an aspect of the present invention, there is provided a method of operating a base station in a wireless communications network, the base station being arranged to communicate with a mobile terminal, the method comprising one or more of: determining one or more transmission priority factors indicating an operating parameter of the network, and receiving, from the mobile terminal, an indication of one or more transmission priority factors indicating an operating parameter of the network; based on the one or more determined transmission priority factors and received indications, determining a prioritisation action for the mobile terminal to perform from: prioritising Random Access signal transmission over signal transmission on the uplink shared channel; prioritising signal transmission on the uplink shared channel over Random Access signal transmission; or making no change to the existing signal transmission protocol; and providing an indication of the prioritisation action to the mobile terminal.

The mobile terminal may be configured to communicate with the base station using one or more of: 4G wireless communications and 5G wireless communications.

Signal transmission on the uplink shared channel may take place via Configured Grant and/or Dynamic Grant signal transmissions.

The one or more transmission priority factors indicating an operating parameter of the network may comprise one or more of:
the traffic carried on the uplink shared channel signal transmissions;
a Type of Configured Grant signal transmissions;
a past frequency of beam failures;
a past number of beam failures;
a time between consecutive uplink shared channel signal retransmissions;
link quality;
a likelihood of beam failure;
a likelihood of link failure; and
a resulting or impending topology change.

The traffic carried on the uplink shared channel may comprise one or more of: enhanced Mobile Broadband; Ultra Reliable Low Latency Communications; and massive Machine Type Communications.

Prioritising Random Access signal transmission over signal transmission on the uplink shared channel may comprise transmitting a Random Access signal instead of transmitting a signal on the uplink shared channel when the Random Access signal transmission and signal transmission on the uplink shared channel clash in time. Prioritising signal transmission on the uplink shared channel over Random Access signal transmission may comprise transmitting a signal on the uplink shared channel instead of transmitting a Random Access signal when the Random Access signal transmission and signal transmission on the uplink shared channel clash in time. The clash in time may be a partial overlap of time periods (e.g. the end of a first time period for first signal transmission may clash with the start of a second time period for second data transmission).

Prioritising Random Access signal transmission over signal transmission on the uplink shared channel may comprise overwriting data to be transmitted on the uplink shared channel with data to be transmitted in a Random Access signal transmission when the data to be transmitted in a Random Access signal transmission and the data to be transmitted on the uplink shared channel coincide so as to share the same buffer space. Prioritising signal transmission on the uplink shared channel over Random Access signal transmission may comprise overwriting data to be transmitted in a Random Access signal transmission with data to be transmitted on the uplink shared channel when the data to be transmitted in a Random Access signal transmission and the data to be transmitted on the uplink shared channel coincide so as to share the same buffer space. Thus in some examples, overwriting data in a buffer may be performed in the event of a data collision in which Random Access data attempts to occupy the same buffer storage location as Configured Grant or Dynamic Grant data, and/or Configured Grant or Dynamic Grant data attempts to occupy the same buffer storage location as Random Access data.

The buffer space may be in a HARQ buffer of process 0.

The data to be overwritten may be stored in the HARQ buffer of process 0. Overwriting the data may comprise overwriting the data stored in the HARQ buffer of process 0 with one or more of: data stored in a Message 3 buffer; and data scheduled to be transmitted on the uplink shared channel.

The Random Access data may comprise Message 3 data.

Determining the cause of the Random Access procedure initiation may comprise determining that beam failure has occurred.

The method may comprise performing prioritising Random Access signal transmission over signal transmission on the uplink shared channel when the cause of the Random Access procedure initiation comprises beam failure.

The method may comprise performing prioritising signal transmission on the uplink shared channel over Random Access signal transmission when the cause of the Random Access procedure initiation comprises beam failure.

The method may comprise performing making no change to prioritisation of signal transmission on the uplink shared channel or prioritisation of Random Access signal transmission when the cause of the Random Access procedure initiation comprises beam failure. For example, the likelihood of successful CG transmission may be low.

Determining the cause of the Random Access procedure initiation may comprise determining a lack or unavailability of Physical Uplink Control Channel resources on a single Scheduling Request configuration. Unavailability of PUCCH resources may arise if there are resources present, but they cannot be used because a different transmission is running in parallel.

The method may comprise performing prioritising Random Access signal transmission over signal transmission on the uplink shared channel when the cause of the Random Access procedure initiation comprises a lack or unavailability of Physical Uplink Control Channel resources on a single Scheduling Request configuration.

If the Type of Configured Grant signal transmissions is Type 1, Configured Grant signal transmission may be prioritised over Random Access signal transmission. If the Type of Configured Grant signal transmissions is Type 2, Random Access signal transmission may be prioritised over Configured Grant signal transmission.

Prioritising Random Access signal transmission over signal transmission on the uplink shared channel may be performed by starting or restarting the configured-Grant-Timer for the Hybrid Automatic Repeat Request process corresponding to the Random Access signal transmission.

According to an aspect, there is provided a method of operating a base station in a wireless communications network, the base station being arranged to communicate with a mobile terminal, the method comprising:

one or more of:

determining a cause of the Random Access procedure initiation following initiation of a Random Access procedure;

determining one or more transmission priority factors indicating an operating parameter of the network;

receiving, from the mobile terminal, an indication of a cause of the Random Access procedure initiation following initiation of a Random Access procedure; and receiving, from the mobile terminal, an indication of one or more transmission priority factors indicating an operating parameter of the network;

based on the one or more determined causes, determined transmission priority factors, and received indications, determining a prioritisation action for the mobile terminal to perform from:

prioritising Random Access signal transmission over signal transmission on the uplink shared channel;

prioritising signal transmission on the uplink shared channel over Random Access signal transmission; or making no change to the existing signal transmission protocol; and providing an indication of the prioritisation action to the mobile terminal.

According to an aspect there is provided a mobile terminal in a wireless communications network arranged to communicate with a base station and further arranged to execute any method disclosed herein.

According to an aspect there is provided a base station in a wireless communications network arranged to communicate with a mobile terminal and further arranged to execute any method disclosed herein.

According to an aspect there is provided a wireless communications network system comprising at least one base station arranged to execute any method disclosed herein, the base station arranged to communicate with at least one mobile terminal arranged to execute any method disclosed herein.

According to an aspect there is provided a computer program comprising computer executable instructions which when executed by a computer cause the computer to perform any method disclosed herein.

According to an aspect there is provided a computer readable storage medium having stored thereon any computer program disclosed herein.

In a first aspect of the invention, a wireless communication system includes a first base station, for example a wireless non-terrestrial network base station, supporting communications with a plurality of wireless communication units, and a second base station, for example a replacement wireless non-terrestrial network base station. The second base station includes a transceiver and a processor operably coupled to the transceiver and arranged to establish a wireless backhaul or front-haul communication link with the first base station and broadcast a transmission to the plurality of remote wireless communication units at a second frequency that is different to a first frequency used by the first base station, substantially within a coverage area of the first base station, wherein the broadcast transmission comprises at least one cell identifier parameter and at least one synchronization signal. The first base station includes a transceiver and a processor operably coupled to the transceiver and arranged to broadcast an inter-frequency measurement report request on the first frequency to the plurality of remote wireless communication units served by the first base station, wherein the measurement report request includes measurements for the second frequency.

In this manner, a serving base station is able to obtain inter-frequency measurement reports from its served remote wireless communication units (e.g. UEs) and, say, initiate a handover operation when they are in a radio resource controlled (RRC)-connected state. Thus, in some examples of the invention, a mechanism for provision of signalling procedures can support a group handover scenario in an airborne NTN base station (or gNB) for the RRC-connected state UEs.

In an optional example, the first base station and second base station may be non-terrestrial network, NTN, airborne base stations. In some examples, a new broadcast signalling message may be configured as part of the System Information Block (SIB). In some examples, this new SIB message may be configured in ways that only the NTN connected UEs (and devices) would be able to read. For example, this new SIB message may be configured with a binary header bit, and when active can indicate to the NTN connected UE's to read-on for the full message.

In an optional example, the inter-frequency measurement report request may include a measurement threshold configured to trigger the remote wireless communication units performing and reporting the measurement where a signal strength from the second NTN base station is $\Delta$dB higher than a measured signal strength of the first NTN base station. In this manner, this will prompt the remote wireless communication units (such as UEs) to conduct the measurements of the neighbour base station that is now physically very near to the serving/camped-on base station.

In some examples, a mechanism for broadcast signalling from the serving base station or gNB is proposed, through which the gNB requests the RRC-connected UEs to provide inter-frequency signal strength measurements of the neighbour gNBs. In some examples, the threshold $\Delta$ dB for the measurement reporting may be minimized, so that the UE will report neighbour gNB signal strengths even if they are similar to the serving gNB signal strengths.

In an optional example of the invention, it is envisaged that the remote wireless communication units (e.g. UEs) may be in one of the following operational states when the broadcast message is received: a RRC-connected state: where the UEs are actively communicating data with another UE or a PDN; a RRC-inactive state: where the UEs have minimal signalling with the base station and can transmit sporadic, short packets, for example as defined for a 5G system; a RRC-idle state: where the UEs are not performing any data communication.

In some examples, the RRC-inactive UEs may be configured to carry out cell reselection procedures, after conducting the inter-frequency (neighbour cell) measurements. In some examples, the cell re-selection may be carried out even when the neighbour gNB signal strengths are of a similar value, as the $\Delta$ dB thresholds are now minimized. In some examples, the cell re-selection procedures may be configured to happen according to the 5G NR/LTE standards, initiated by the aforementioned broadcast signalling procedure.

In an optional example of the invention, the NTN base stations may be implemented as simple remote radio heads (RRH) carrying out only the transceiver radio frequency (RF) functions, whilst the higher layer RAN operations may be carried out in a centralized processing unit, preferably based on the ground. This option, termed a fully centralized RAN, much simplifies the design and reduces power consumption of the air-borne (NTN) part of the network, thereby allowing longer operational times before replacement due to battery drain or maintenance reasons.

In some examples, the communications between the RRHs and the centralized processing unit may occur through front-haul links. In this configuration the handover and/or cell re-selection options may be physically carried out in the centralized processing unit, but the signalling procedures between RRH and the UEs may remain the same as current 5G operation.

In an optional example of the invention, the processor centralization may be carried out partially, to any intermediate step below a fully centralized configuration. Again, in this example embodiment, the signalling procedures remain unchanged.

In some examples, the serving base station or gNB may be configured to carry out the handover procedures for the RRC-connected UEs that report the signal strengths of neighbour gNB(s). In some examples, the handovers may be carried out even when the neighbour gNB signal strengths are of similar value, as the $\Delta$ dB thresholds are now minimized. In some examples, the handover procedures may be configured to happen separately for each UE, as and when they report back the requested measurements. In some examples, multiple handover procedures may happen simultaneously, as multiple RRC connected UEs will report back the signal strengths following the inter-frequency measurements. In some examples, the handover procedures may be configured to happen according to the 5G NR/LTE standards, initiated by the aforementioned broadcast signalling procedure.

In a second aspect of the invention, a first base station is described that communicates with a plurality of remote wireless communication units. The first base station includes a processor, operably coupled to a transceiver and arranged to establish a wireless backhaul or front-haul communication link with a second replacement base station, operate at a first frequency that is different to a second frequency used by the second replacement base station and broadcast an inter-frequency measurement report request on the first frequency to the plurality of remote wireless communication units served by the first base station, wherein the measurement report request includes a request for signal strength measurements for the second frequency.

In a third aspect of the invention, a remote wireless communication unit is described that is configured to communicate with a first base station on a first frequency and a replacement second base station on a second frequency, wherein the remote wireless communication unit includes a transceiver; and a processor, operably coupled to the transceiver and arranged to receive a broadcast a transmission at the second frequency that is different to a first frequency used by the first base station, substantially within a coverage area of the first base station, wherein the broadcast transmission comprises at least one cell identifier parameter; and at least one synchronization signal, receive a broadcast inter-frequency measurement report request on the first frequency, wherein the measurement report request includes measurements for a second frequency, different to the first frequency, and used by a second replacement base station, and transmit an inter-frequency measurement report to the first base station in response thereto.

In a fourth aspect of the invention, a method for a first base station that communicates with a plurality of remote wireless communication units is described. The method includes establishing a wireless backhaul or front-haul communication link with a second replacement base station; operating at a first frequency that is different to a second frequency used by the second replacement base station; and broadcasting an inter-frequency measurement report request on the first frequency to the plurality of remote wireless communication units served by the first base station, wherein the measurement report request includes a request for signal strength measurements for the second frequency.

In a fifth aspect of the invention a method for a remote wireless communication unit configured to communicate with a first base station on a first frequency and a replacement second base station on a second frequency is described. The method includes: receiving from the second replacement base station a broadcast transmission on a second frequency, wherein the second replacement base station operates substantially within a coverage area of the first base station, and wherein the broadcast transmission comprises at least one cell identifier parameter; and at least one synchronization signal of the second replacement base station; being served by the first base station; receiving from the first base station a broadcast inter-frequency measurement report request on the first frequency, wherein the measurement report request includes a request for measurements on the second frequency that is different to the first frequency; and transmitting an inter-frequency measurement report to the first base station in response thereto.

Other aspects, advantages, and salient features of the invention will become apparent to those skilled in the art from the following detailed description, which, taken in conjunction with the annexed drawings, disclose exemplary embodiments of the invention.

Advantageous Effects of Invention

It is an aim of certain exemplary embodiments of the present invention to address, solve and/or mitigate, at least partly, at least one of the problems and/or disadvantages associated with the related art, for example at least one of the problems and/or disadvantages described above. It is an aim of certain exemplary embodiments of the present invention to provide at least one advantage over the related art, for example at least one of the advantages described below.

BRIEF DESCRIPTION OF DRAWINGS

The above and other aspects, and features and advantages of certain exemplary embodiments and aspects of the present invention will be more apparent from the following detailed description when taken in conjunction with the accompanying drawings, in which.

MODE FOR THE INVENTION

Figure 1A:
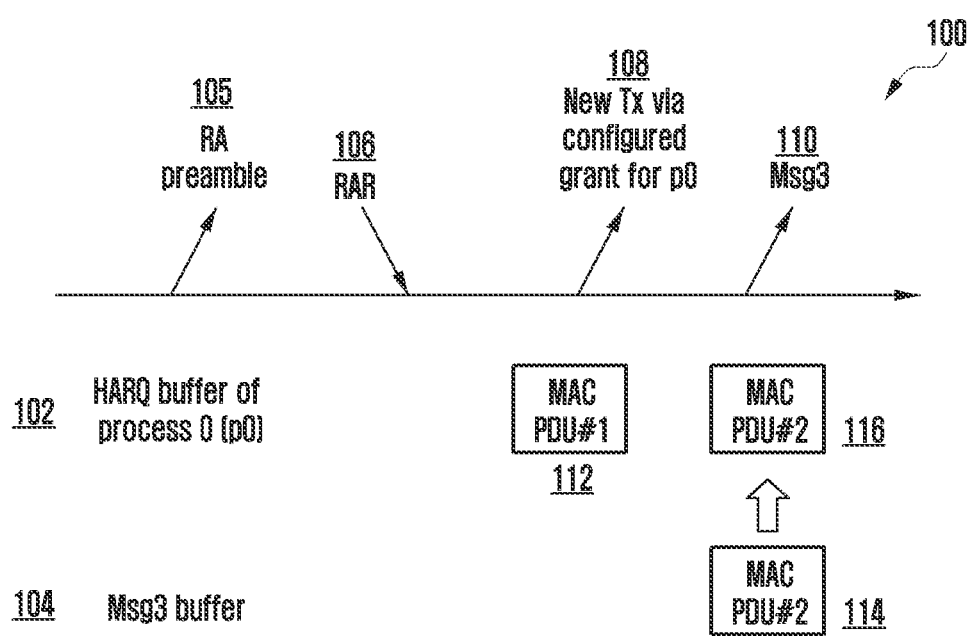
FIGS. 1a and 1b illustrate collisions between RA Msg3 and CG signals in telecommunications networks in an exemplary embodiment.
Figure 1B:
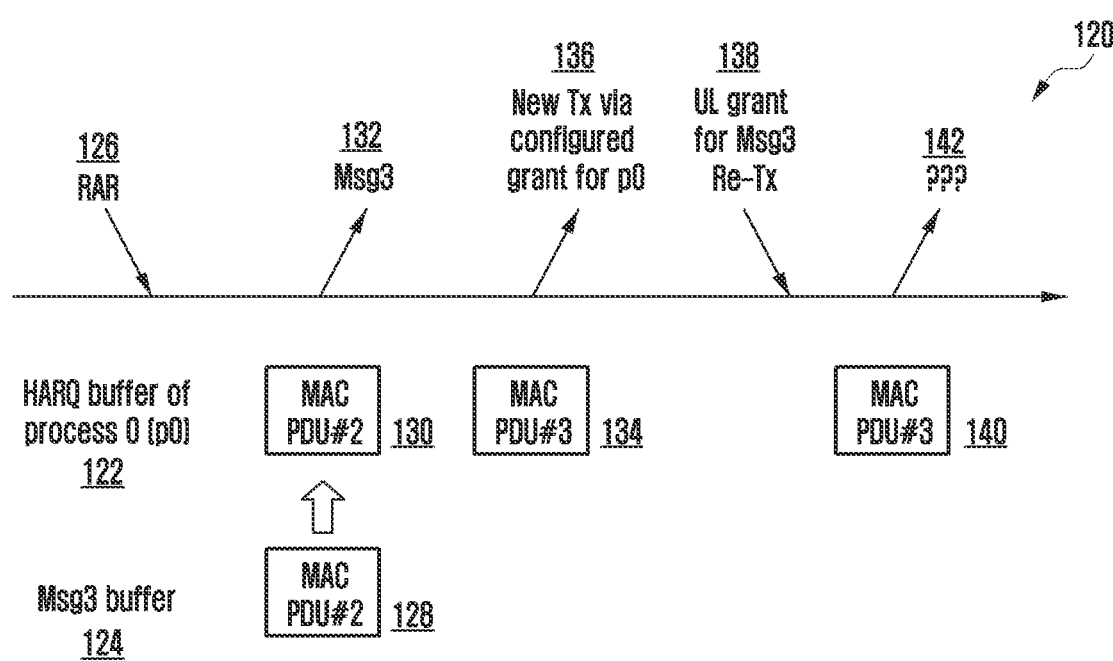

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

Certain embodiments of the present invention provide methods, apparatus and systems for providing improved signal handling in 4G and 5G networks by, following initiation of a Random Access procedure, determining a cause of the Random Access procedure initiation; and based on the determined cause, performing one of: prioritising Random Access signal transmission over signal transmission on the uplink shared channel; prioritising signal transmission on the uplink shared channel over Random Access signal transmission; or making no change to the existing signal transmission protocol. Certain embodiments of the present invention provide methods, apparatus and systems for providing improved signal handling in 4G and 5G networks by determining one or more transmission priority factors indicating an operating parameter of the network; and based on the determined one or more transmission priority factors, performing one of: prioritising Random Access signal transmission over signal transmission on the uplink shared channel; prioritising signal transmission on the uplink shared channel over Random Access signal transmission; or making no change to the existing signal transmission protocol.

However, the skilled person will appreciate that the present invention is not limited to these examples, and may be applied in any suitable system or standard, for example one or more existing and/or future generation wireless communication systems or standards.

Examples disclosed herein consider, in the event of RA being initiated, the difference between RA due to beam failure (which is a focus of prior art solutions) and RA due to another possible reason. Another possible reason for RA is the failure of a single SR configuration of multiple available SR configurations, which is a possibility in 5G systems. RA may be performed, but this alone does not indicate beam or link quality. In the event of beam or link quality remaining adequate (i.e. it is possible to continue with CG) even though RA is taking place, it may be useful to continue to support/allow any ongoing CG process, rather than simply assuming CG cannot continue and taking a blanket approach of and assuming that beam failure needs to be addressed (and thus that CG is not possible). Examples disclosed herein consider one or more transmission priority factors, such as the traffic carried on the uplink shared channel signal transmissions; a Type of Configured Grant signal transmissions; a past frequency of beam failures; a past number of beam failures; a time between consecutive uplink shared channel signal retransmissions; link quality; a likelihood of beam and/or link failure; and a resulting or impending topology change. Based on these factors, examples disclosed herein may prioritise RA over CG or DG signal transmissions, prioritise CG or DG over RA signal transmission, or take no action regarding changing signal transmission priorities.

Overall, the approach is not to assume that a blanket approach to prioritise RA signal transmissions over CG or DG transmissions in the event of both RA and CG or DG data signals requiring buffer space (and thus risking "data collision" in which one or the other data signal is lost). Rather, by considering the cause of a beam failure in the event of beam failure, and/or considering one or more transmission priority factors, a determination may be made regarding which signals transmissions it may be better to prioritise and then an appropriate prioritisation may be made.

For example, if there is total beam failure, then no data may be transmitted at all and thus CG or DG need not be prioritised. It is better to prioritise RA signal transmissions in order to re-establish the beam connection. In another example, there may be an indicated beam failure, but this may not cause a complete termination of communication connection. In this event, if there is critical data to be transmitted through CG (e.g. time-sensitive health data such as pacemaker data), it may be better to prioritise CG signal transmissions in an attempt to continue transmitting the data, and address the indicated beam failure after data transmission (or if it is indicated that data transmission still cannot take place following CG signal transmission prioritisation).

Figure 2A:
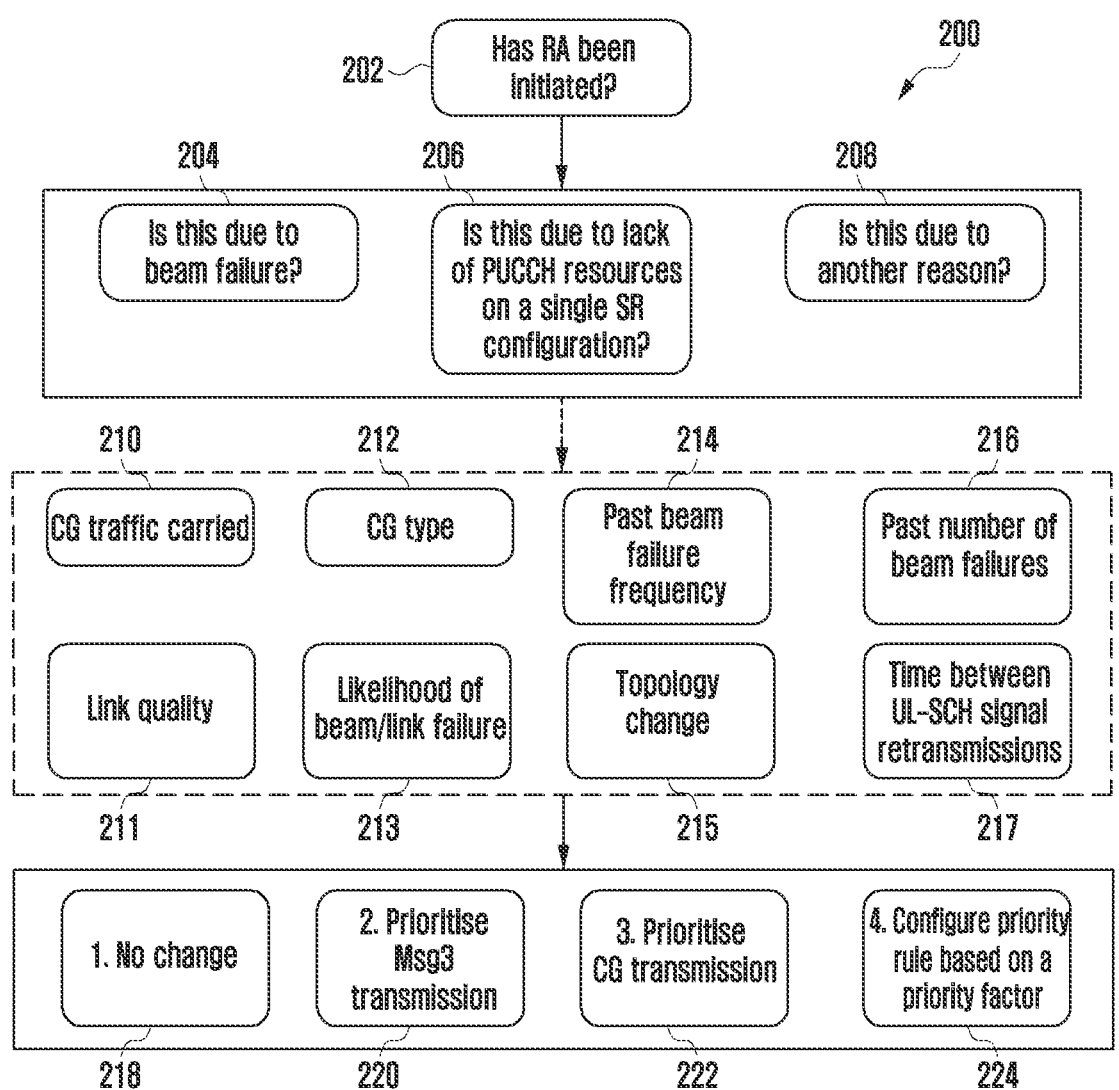
FIGS. 2a, 2b and 2c illustrate methods of handling collisions between RA signals and CG signals in a telecommunications network in exemplary embodiments.

FIG. 2a illustrates an example method 200 of handling collisions between Random Access signals and Configured Grant signals in a telecommunications network. A mobile device may communicate with a base station in the network. In the network, a Random Access (RA) procedure has been initiated 202, for example due to determination of beam failure. In this example there is a Configured Grant (CG) process which allows for data to be transmitted in periodically scheduled CG windows. As described above, in certain circumstances, Msg3 data may overwrite CG data in the HARQ p0 buffer, and/or Msg3 data may be overwritten by CG data in the HARQ p0 buffer. In some examples, data stored in the HARQ p0 buffer may be overwritten by data scheduled to be transmitted on the uplink shared channel. For example, each data type may have been allocated the same buffer space, or each may have been scheduled for transmission at the same time. By considering the reason for initiation of an RA process, either CG data or RA Msg3 data may be prioritised for storage and transmission, thereby retaining the more important data type for storage and transmission for the particular network circumstances. In some examples, no change to the existing signal transmission protocol (i.e. no change in prioritisation of a particular data type/packet) may be determined to be an appropriate course of action.

Following determination that RA has been initiated 202, the method checks for the reason why RA was initiated. For example, RA may be determined to be initiated due to beam failure 204 (that is, determining the cause of the RA procedure initiation comprises determining that beam failure has occurred). As another example, RA may be determined to be initiated because there is a lack or unavailability of PUCCH resources on a single SR configuration 206 (this applies to 5G networks in which there may be several SR configurations available). There may be another reason 208 for initiating RA. In the example of FIG. 2a there is no specified order in which the different reasons 204, 206, 208 may be checked for. There may be a specified order in some examples, such as that shown in FIG. 2b.

In some examples, prioritising RA Msg3 transmission, prioritising transmission on an UL-SCH, or performing no action to change priority, may consider both the reason for RA initiation 204, 206, 208, and also consider one or more other transmission priority factors. For example, depending on the traffic carried on the UL-SCH 210, on a Type of CG 212, on a frequency of past beam failures 214, on a number of past beam failures 216, a time between consecutive uplink shared channel signal retransmissions 217; on the link quality 211; on a likelihood of beam and/or link failure 213; and/or on a resulting or impending topology change 215, a different level of priority may be given to prioritise RA Msg3 transmission 220, transmission on the UL-SCH 222, or make no change to current priorities 218. This is illustrated as the prioritisation option 224 which configures a priority rule based on the one or more priority factors 210, 212, 214, 216. Again, in this example, there is no specified order in which the different transmission priority factors 210, 212, 214, 216 may be checked for. There may be a specified order of checking in other examples. Not all the illustrated reasons may be checked for in some examples.

Examples of CG traffic carried on the uplink shared channel 210 comprise enhanced Mobile Broadband (eMBB) Communications; Ultra Reliable Low Latency Communications (URLLC); and massive Machine Type Communications (MMTC). For URLLC traffic, CG could be prioritised over RA, especially for the case of RA due to SR configuration failure.

Examples of the Type of CG traffic on the uplink shared channel 212 comprise Type 1 and Type 2 Communications. In some examples, if the Type of CG signal transmissions is Type 1 (which may be used for more critical data), CG signal transmission may be prioritised over RA signal transmission because it is important that the data transmission is pursued; and if the Type of CG signal transmissions is Type 2 (which may be used for less critical data), RA signal transmission may be prioritised over CG signal transmission, because it is less important that the data transmission is pursued and more important that the detected beam failure is addressed to restore the beam connection.

Examples of the number, or frequency, of past beam failures 214, 216 may be, for example, a number of beam failures (e.g. 2, 5, 10, or more) in a past given time period (e.g. the average number of failures per hour in the past day, or the number of failures in the past 4 hours). Of course, a different time period may be specified. For example, if the number, or frequency, is above a predetermined threshold (e.g. 5 failures in the past hour, an average of 3 or more failures every hour for the last 4 hours) then it may be determined that beam failure is a key problem and addressing this issue is prioritised by prioritising transmission of RA signals over CG signals. As another example, if the frequency is below a predetermined threshold then it may be determined that beam failure is not a key problem and transmission of CG signals may be prioritised over RA signals to allow the continuation of data transmission attempts, given that the beam stability appears acceptable to allow for data transmission.

The time between consecutive uplink shared channel signal retransmissions may provide a parameter on which to base the prioritisation of one data transmission over another. For example, if the retransmissions are relatively frequent, then RA signals may be prioritised.

The link quality 211 provides an estimate of the likelihood of per-link retransmissions required. If this likelihood is above a certain (in some examples configurable) threshold, RA signals may be prioritised over CG signals. A likelihood of beam and/or link failure 213 may be determined based on one or more factors such as past beam or link failures, weak beam or link signal strength, or a moving mobile terminal, for example.

A resulting or impending topology change may arise due to changes in relay networks (e.g. the addition or removal of new nodes, and/or blockage issues), and weak signal strength indicating an impending handover. Based on an indication of such a change, RA signals may be prioritised over CG signals.

Following consideration of the reason for RA initiation 204, 206, 208 (and in some examples one or more other transmission priority factors 210, 212, 214, 216) the change (or decision not to change) priority for transmission of RA Msg3 data or data on the UL-SCH may be made. Thus, the method may decide to make no changes to the priority of current data transmissions 218, may prioritise RA Msg3 data transmissions 220 over transmissions on the UL-SCH, or may prioritise data transmissions on the UL-SCH over RA Msg3 data transmissions. In some examples, depending on one or more other transmission priority factors 210, 212, 214, 216 as discussed above, as well as the reason for RA initiation, a priority rule may be configured 222. For example, the priority rule may be that transmission on the UL-SCH is prioritised 222 because RA was determined to have been initiated due to beam failure 204, until the past number of beam failures 216 exceeds a predetermined number, after which RA Msg3 transmission is prioritised 220.

Figure 2B:
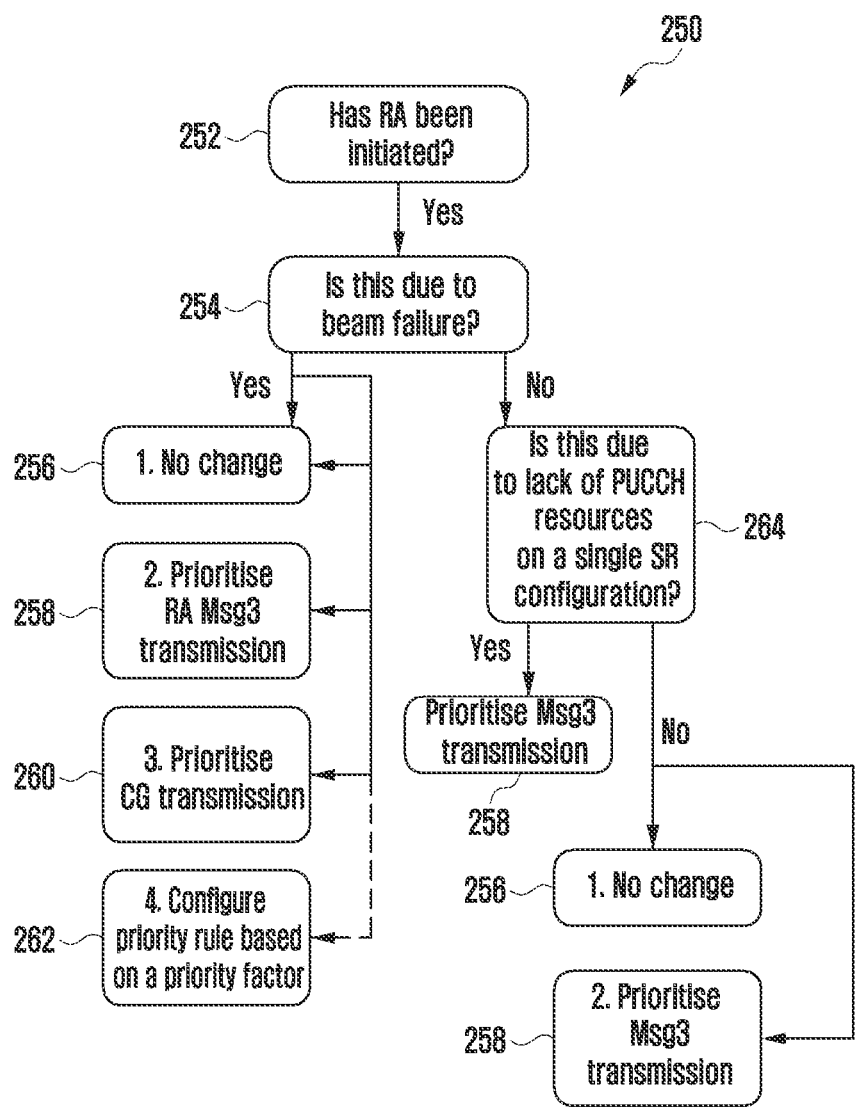

FIG. 2b illustrates an example method of handling collisions between Random Access signals and Configured Grant signals in a telecommunications network by considering reasons for RA initiation in a specific order. In this example, it is optional whether a transmission priority factor is taken into account 262.

In step 252 of the method 250, the method checks if RA has been initiated. The method then checks firstly if RA is initiated due to detected beam failure 254. If YES, beam failure is determined to be the cause of RA initiation, then the method can decide to make a prioritisation for data transmission, either to make no change of data transmission priorities 256, to prioritise Msg3 data transmissions 258, to prioritise CG data transmissions 260, or to make a prioritisation based on a transmission priority factor 262 as discussed above.

Thus in some examples, the method may comprise performing prioritising RA signal transmission over signal transmission on the UL-SCH 258 when the cause of the RA procedure initiation comprises beam failure. In some example the method may comprise performing prioritising signal transmission on the UL-SCH over RA signal transmission 260 when the cause of the RA procedure initiation comprises beam failure. In some example the method may comprise making no change to prioritisation of signal transmission on the uplink shared channel or prioritisation of Random Access signal transmission 256 when the cause of the Random Access procedure initiation comprises beam failure. For example, the likelihood of successful CG transmission may be low.

If no change to the current specification for data transmissions is made 256, then there may be possible data losses on both transmission and reception sides. However, this may be acceptable if the likelihood of successful CG transmission is low due to the determined beam failure.

A prioritisation may be made to always prioritise RA Msg3 transmission 258, for example because the likelihood of successful CG transmission is low anyway due to determined beam failure. That is, the method may comprise performing prioritising RA Msg3 signal transmission over signal transmission on the UL-SCH when the cause of the RA initiation comprises beam failure. One way of doing this is to start or restart the configuredGrantTimer for the corresponding HARQ process. This may help to ensure that the RA procedure is performed without being interrupted by CG, and to help ensure transmissions via CG have enough retransmission chances. configured-GrantTimer may be applied to the uplink grant indicated in a RAR. In this way, by prioritising RA Msg3 over CG, the determined beam failure may be rectified by RA signal transmission, and then data transmission through CG may continue with a reestablished beam connection.

A prioritisation may be made to always prioritise transmission on the UL-SCH 260, for example because time-critical data is transmitted on the UL-SCH such as medical (e.g. pacemaker) data, vehicle data (e.g. for autonomous vehicle manoeuvring and navigation) or other data. Though beam failure has been determined, it may that there is still a sufficient beam link to allow data transfer (i.e. an indicated beam failure may not be a complete beam and link failure, and so the transmission of critical data is still worth pursuing).

A prioritisation may be made based on a network priority rule 262 as discussed above (e.g. based on the traffic carried on the uplink shared channel, a Type of CG, a past frequency and/or a past number of beam failures; a time between consecutive uplink shared channel signal retransmissions; link quality; a likelihood of beam and/or link failure; and a resulting or impending topology change).

If it is determined that there is RA initiation 252 but not due to beam failure, then there may be a second check for the reason of RA initiation. For example, in a 5G network, it may be that there is a lack or unavailability of PUCCH resource on a single SR configuration 264 so this reason is checked for. If it is determined that there is a lack or unavailability of a PUCCH resources, but only one a single SR configuration of a plurality of available SR configurations, then it may still be possible to transmit RA Msg3 data using the other remaining SR configurations, and therefore RA Msg3 transmission may be prioritised 258. As before, one way of doing this is to start or restart the configuredGrantTimer for the corresponding HARQ process.

If it is determined that there is no beam failure, 254 and no lack or unavailability of PUCCH resources on a single SR configuration 264, then there may be no change made to the current specification for data transmissions 256. As an alternative, Msg3 transmission may be prioritised 258 to ensure that data transmission is attempted to maintain a beam link.

Prioritising RA signal transmission over signal transmission on the UL-SCH comprises transmitting a RA signal instead of transmitting a signal on the UL-SCH when the RA signal transmission and signal transmission on the UL-SCH clash in time. Conversely, prioritising signal transmission on the UL-SCH over RA signal transmission may comprise transmitting a signal on the UL-SCH instead of transmitting a RA signal when the RA signal transmission and signal transmission on the UL-SCH clash in time. That is, in some examples, the two transmissions may be allocated the same transmission slot, and examples disclosed herein may determine to prioritise one transmission over the other.

Prioritising RA signal transmission over signal transmission on the UL-SCH may comprise overwriting data to be transmitted on the UL-SCH with data to be transmitted in a RA signal transmission when the data to be transmitted in a RA signal transmission and the data to be transmitted on the UL-SCH coincide so as to share the same buffer space. Conversely, prioritising signal transmission on the UL-SCH over RA signal transmission may comprise overwriting data to be transmitted in a RA signal transmission with data to be transmitted on the UL-SCH when the data to be transmitted in a RA signal transmission and the data to be transmitted on the UL-SCH coincide so as to share the same buffer space. For example, prioritising RA signal transmission over CG signal transmission may comprise allowing CG data stored in a HARQ buffer of process 0 to be overwritten with RA data. For example, CG data stored in the HARQ p0 buffer may be overwritten by RA Msg3 data for RA data transmission, for example to restore a beam link following beam failure.

As another example, prioritising CG signal transmission over RA signal transmission may comprise allowing RA data stored in a HARQ buffer of process 0 to be overwritten with CG data. For example, CG data may overwrite any RA Msg3 data stored in the HARQ p0 buffer to attempt to continue with CG data transmission. For example, certain data such as real-time medical data, vehicle control and/or positioning data, and/or any other time-critical data may be prioritised over RA data transmissions to attempt to ensure data transmission of the time critical data while there may not necessarily be a beam failure or link failure. Prioritising CG signal transmission over RA signal transmission may take place when the cause of the RA procedure initiation comprises a lack or unavailability of PUCCH resources on a single SR configuration, because in a 5G system there are other SR configurations available through which RA signal transmission may take place.

Data overwriting the data stored in a HARQ buffer of process 0 (RA Msg3 data or CG data), may move from a Message 3 buffer to the HARQ buffer of process 0. The data overwriting the data stored in the HARQ buffer of process 0 may be the data for a new uplink shared transmission.

Figure 2C:
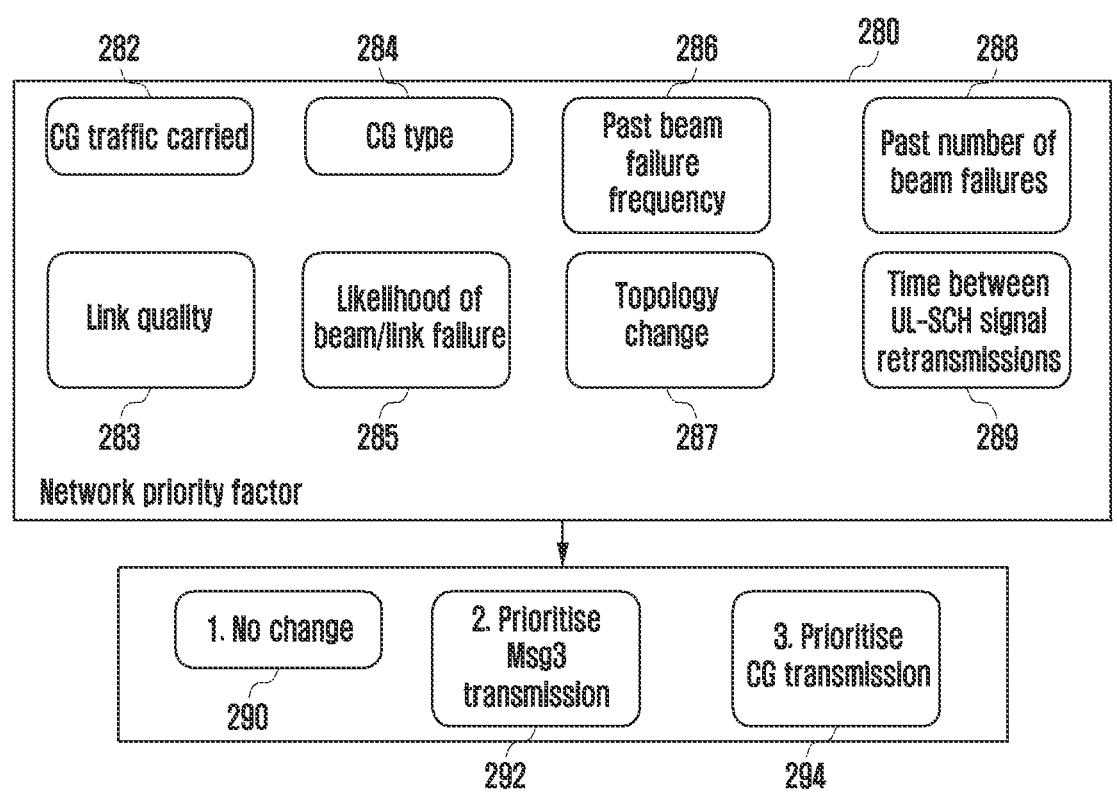

FIG. 2c illustrates an example method 280 of handling collisions between Random Access signals and Configured Grant signals in a telecommunications network. In this example, a transmission priority factor is taken into account 262 without considering whether there is a beam failure.

The method checks one or more transmission priority factors, for example the traffic carried on the uplink shared channel 282, a Type of CG 284, a past frequency 286 and/or a past number 288 of beam failures; a time between consecutive uplink shared channel signal retransmissions 289; link quality 283; a likelihood of beam and/or link failure 285; and a resulting or impending topology change 287, as discussed above.

Based on one or more of these factors, which indicate the operating parameters of the network (e.g. URLLC traffic, Type 2 CG data, high beam failure frequency), a determination is made to make no change to the signal priorities 290, to prioritise RA Msg3 transmission over CG signal transmission 292, or to prioritise CG transmission over RA Msg3 signal transmission 294. Such prioritisations may be made for reasons as discussed above (e.g. criticality of attempting data transmission, reliability/stability of beam which is related to the likelihood of beam failure).

While certain examples above focus on the use of CG signal transmission, the skilled person will appreciate that similar examples which use DG signal transmissions are also possible.

One or more of the above described methods fall within the scope of a method of operating a mobile terminal in a wireless communications network, the mobile terminal being arranged to communicate with a base station, the method comprising: one or more of: determining a cause of the Random Access procedure initiation following initiation of a Random Access procedure; and determining one or more transmission priority factors indicating an operating parameter of the network; and based on one or more of the determined cause of Random Access procedure initiation and the determined one or more transmission priority factors, performing one of: prioritising Random Access signal transmission over signal transmission on the uplink shared channel; prioritising signal transmission on the uplink shared channel over Random Access signal transmission; or making no change to the existing signal transmission protocol.

One or more of the above described methods fall within the scope of a method of operating a base station in a wireless communications network, the base station being arranged to communicate with a mobile terminal, the method comprising: one or more of: determining a cause of the Random Access procedure initiation following initiation of a Random Access procedure; determining one or more transmission priority factors indicating an operating parameter of the network; receiving, from the mobile terminal, an indication of a cause of the Random Access procedure initiation following initiation of a Random Access procedure; and receiving, from the mobile terminal, an indication of one or more transmission priority factors indicating an operating parameter of the network; based on the one or more determined causes, determined transmission priority factors, and received indications (note that not all are required; in some examples only one indicator or determination is required, and in other examples more than one determination and/or indication may be required), determining a prioritisation action for the mobile terminal to perform from: prioritising Random Access signal transmission over signal transmission on the uplink shared channel; prioritising signal transmission on the uplink shared channel over Random Access signal transmission; or making no change to the existing signal transmission protocol; and providing an indication of the prioritisation action to the mobile terminal.

In some examples the base station may determine a cause of the Random Access procedure initiation following initiation of a Random Access procedure by inferring a cause of RA initiation. For example, the base station may already have received an indication of beam failure, or may know that there is no resource for a particular SR configuration. In some examples the base station may determine one or more transmission priority factors indicating an operating parameter of the network. For example, the network may have better or exclusive knowledge of some of the parameters (e.g. resulting or impending topology change) than the mobile terminal.

Figure 3:
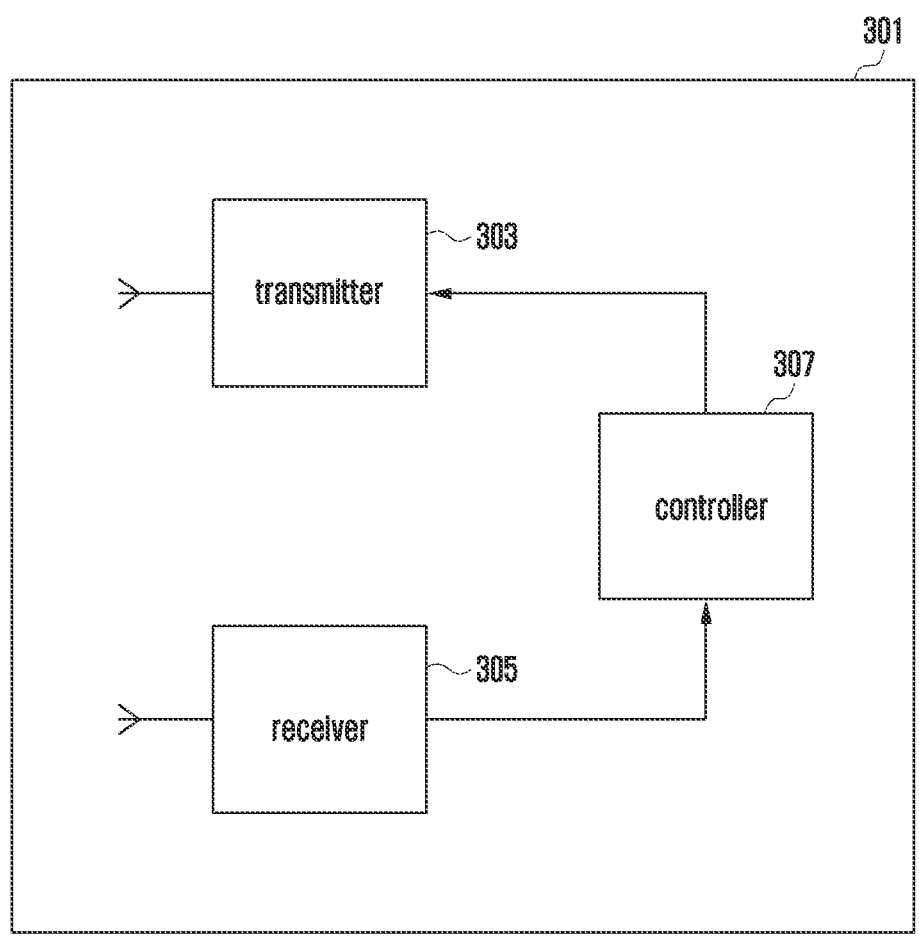
FIGS. 3 and 4 are schematic diagrams of a base station and a mobile device, respectively, according to exemplary embodiments.

FIG. 3 is a schematic diagram of a base station according to an exemplary embodiment.

The base station 301 comprises a transmitter 303 for transmitting signals to a mobile device. In particular, the transmitter 303 may be configured for transmitting RAR signals to one or more mobile devices 103, for example as described above. The transmitter 303 may be configured for transmitting signals according to mm-wave communications, for example as described above. The transmitter 303 may be configured for transmitting a wide beam signal, and/or a narrow beam signal, for example. The transmitter 303 may be configured for transmitting signals according to one or more methods as described above, such as transmitting an indication of the prioritisation action to a mobile terminal.

The base station 301 also comprises a receiver 305 for receiving signals from a mobile device, for example for receiving CG data signals or RA Msg3 data signals from a mobile device, or receiving an indication of a cause of RA initiation and/or one or more transmission priority factors from a mobile terminal.

The transmitter 303 and the receiver 305 may be provided in any suitable configuration, for example as one or more transmitters (or an array thereof) and one or more receivers (or an array thereof) provided separately, or as one or more transceivers (or an array thereof).

The base station 301 also comprises a controller or processor 307 configured for executing, performing and/or controlling various operations, processes and/or method steps, for example some or all the operations described above in relation to the base station according to any embodiment, aspect, example and/or claim disclosed herein, such as determining a prioritisation action for transmission to a mobile terminal. The controller 307 may comprise one or more modules for performing respective operations. The skilled person will appreciate that in certain embodiments a single module may be provided to perform multiple operations.

Figure 4:
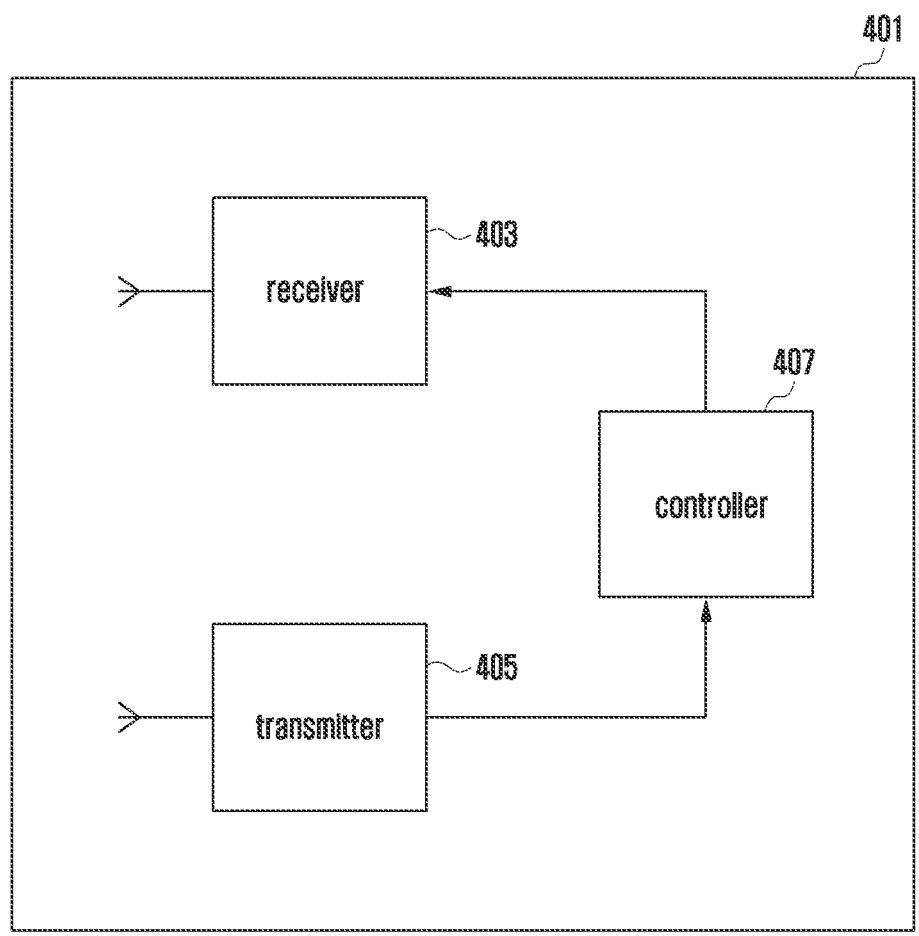
Figure 5:
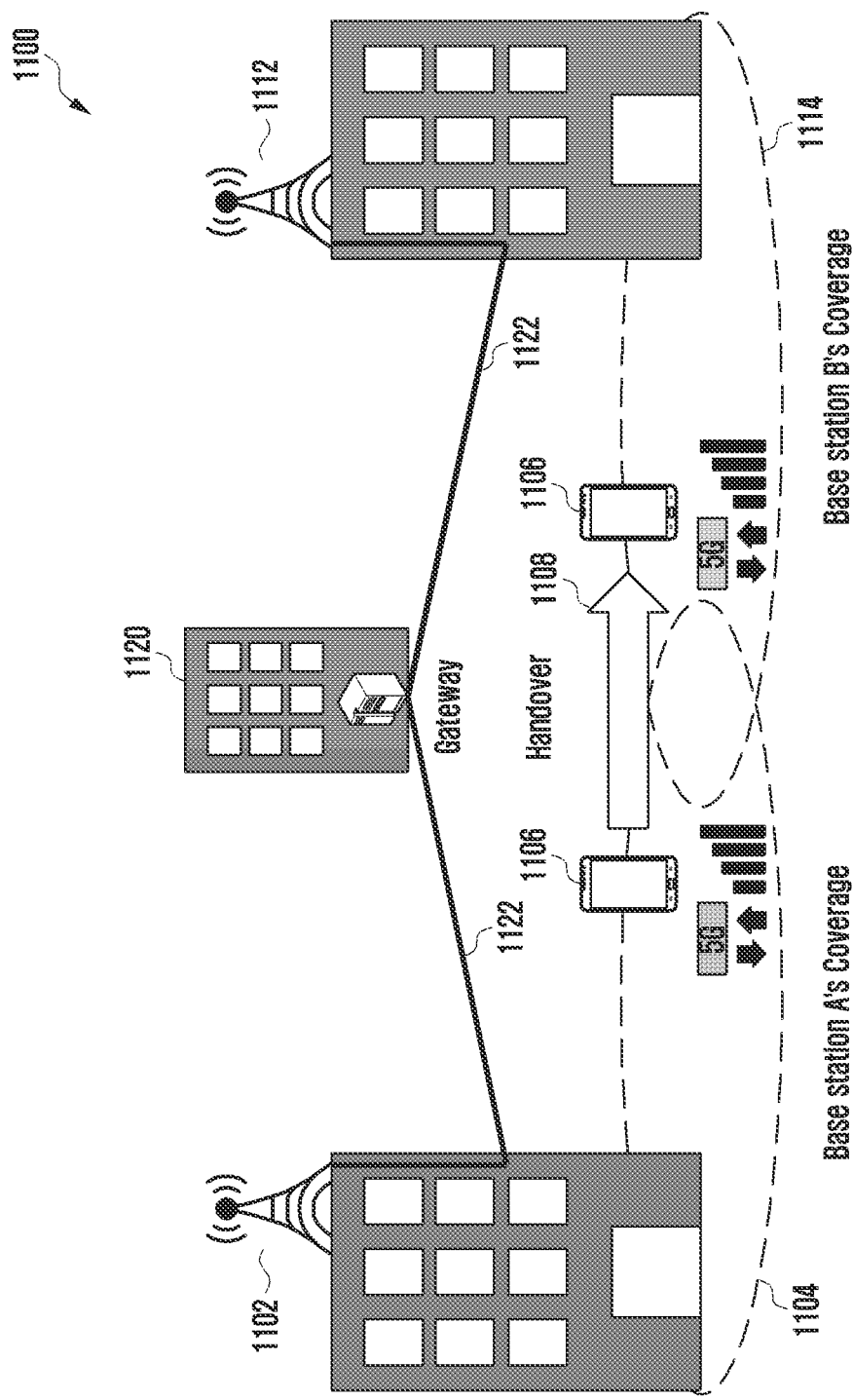
FIG. 5 illustrates a known simplified 5G architecture configured to handle handover of individual communications.
Figure 6:
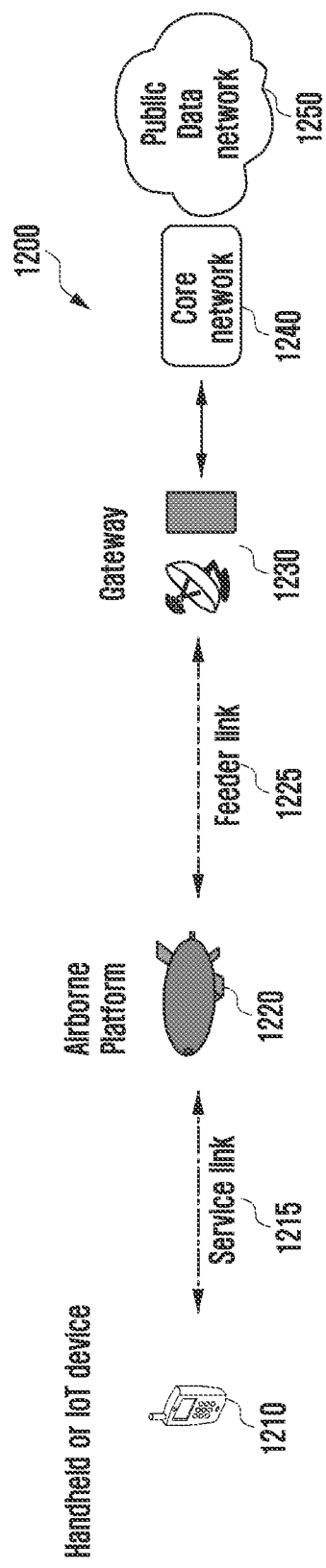
FIG. 6 illustrates a proposed 5G link configuration for NTN air-borne communications.

FIG. 4 is a schematic diagram of a mobile device according to an exemplary embodiment.

The mobile device 401 comprises a receiver 403 for receiving signals from a base station. In particular, the receiver 403 may be configured for receipt of RAR, or an indication of the prioritisation action to a mobile terminal, for example as described above. The receiver 403 may be configured for receiving signals according to mm-wave communications, for example as described above. The receiver 403 may be configured for receiving a wide beam signal, and/or a narrow beam signal, for example. The receiver 403 may be configured for receiving signals according to one or more methods as described above.

The mobile device 401 also comprises a transmitter 405 for transmitting signals to a base station, for example for transmitting CG data signals or RA Msg3 data signals to a base station, or transmitting an indication of a cause of RA initiation and/or one or more transmission priority factors to a base station.

The receiver 403 and the transmitter 405 may be provided in any suitable configuration, for example as one or more receivers (or an array thereof) and one or more transmitters (or an array thereof) provided separately, or as one or more transceivers (or an array thereof).

The mobile device 401 also comprises a controller or processor 407 configured for executing, performing and/or controlling various operations, processes and/or method steps, for example some or all the operations described above in relation to a mobile device 401 according to any embodiment, aspect, example and/or claim disclosed herein. The controller 407 may comprise one or more modules for performing respective operations. For example, the controller 407 may comprise modules configured to determine a cause of the Random Access procedure initiation following initiation of a Random Access procedure, determine one or more transmission priority factors indicating an operating parameter of the network, prioritise Random Access signal transmission over signal transmission on the uplink shared channel and prioritise signal transmission on the uplink shared channel over Random Access signal transmission. The skilled person will appreciate that in certain embodiments a single module may be provided to perform multiple operations.

It will be appreciated that the above methods and apparatus apply to networks comprising one or more mobile terminals and base stations which operate according to 4G wireless communications and 5G wireless communications standards, unless it is clear that the feature only applies to 5G standards (e.g. in the case of determining whether a single SR configuration of a plurality has a lack or unavailability of PUCCH resources, because there is only one SR configuration in 4G systems whereas 5G systems have a plurality of SE configurations).

Examples of the invention describe a wireless communication system that includes a serving base station and a replacement base station, which in some instances may be a first serving non-terrestrial network, NTN, airborne base station and a second replacement NTN airborne base station, and a plurality of remote wireless communication units, such as UEs or MTC devices. Examples of the invention describe a mechanism whereby UEs or MTC devices are able to transition from being served by the first serving base station to the second replacement base station. In examples of the invention, the second replacement base station includes a transceiver and a processor arranged to establish a wireless backhaul or front-haul communication link with the first base station. The processor of the second replacement base station is configured to broadcast a transmission to the plurality of remote wireless communication units on a second frequency that is different to a first frequency used by the first base station, and the second replacement base station operates substantially within a coverage area of the first base station. The broadcast transmission from the second replacement base station includes at least one cell identifier parameter; and at least one synchronization signal. In examples of the invention, the first base station includes a transceiver and a processor arranged to broadcast an inter-frequency measurement report request on the first frequency to the plurality of remote wireless communication units served by the first base station, wherein the measurement report request includes measurements for the second frequency.

In this manner, a serving base station is able to obtain inter-frequency measurement reports from its served remote wireless communication units (e.g. UEs) and, say, initiate a handover operation when they are in a radio resource controlled (RRC)-connected state. Thus, in some examples of the invention, a mechanism for provision of signalling procedures can support a group handover scenario in an airborne NTN base station (or gNB) for the RRC-connected state UEs.

In some optional examples, for example in a 5G system, the remote wireless communication units (e.g. UEs), when they are in a RRC-inactive state, may be able to initiate a cell re-selection procedure in response to the conducted measurements.

In some optional examples, for example in a 5G system, the replacement gNB is able to initiate its transmissions and establish a backhaul or front-haul communication link with the serving gNB, say, an X2 link, using current known procedures, prior to the serving gNB initiating the proposed signalling mechanism that includes a broadcast inter-frequency measurement request, in order to expedite a group handover.

Although example embodiments of the invention are described with reference to handover of a group of UEs in a 5G architecture that included NTN base stations, it is envisaged that some aspects of the invention are not so constrained/limited. For example, it is envisaged that the description may be enacted for a long Term Evolved (LTE™) system, for example operating a set of NTN base stations and UEs. For example, it is also envisaged that the description may be enacted for an LTE or 5G-NR ground based special system, where the active base station or gNB needs to replaced, whilst retaining the RRC-active state UEs (for example a cell on wheels (CoW) system that are employed at disaster and emergency situations.

Thus, examples of the invention also describe a mechanism for provision of cell reselection in an airborne NTN base station (or gNB) for the RRC-inactive state UEs. Examples of the invention describe how a camped-on gNB is configured to prompt a cell re-selection process by use of a broadcast message.

Example embodiments are described with respect to a range of potential remote wireless communication units, such as user equipment (UE), Internet of Things (IoT) devices, Human Type Communications (HTC), the new emerging Machine Type Communications (MTC), etc., with the expression remote wireless communication units encompassing all such device implementations and applications. For completeness, the description may interchangeably use such terminology.

Example embodiments are described with reference to radio access networks, which term encompasses and is considered to be equivalent to and interchangeable with communication cells, namely the facilitation of communications within a cell that may access other parts of the communication system as a whole.

Figure 7:
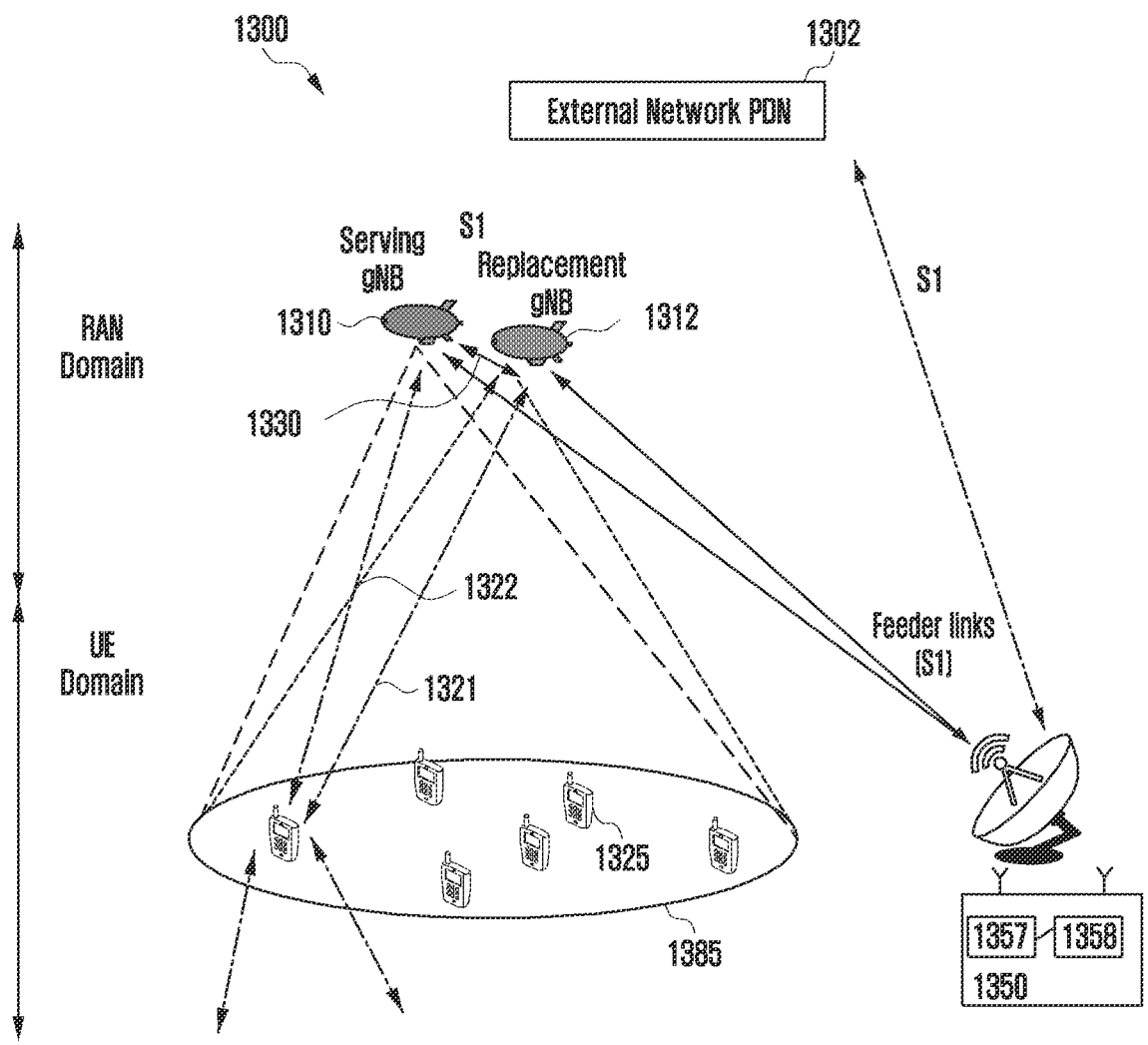
FIG. 7 illustrates a 3GPP™ 5G communication system with NTN base stations adapted in accordance with some example embodiments of the present invention.

Referring now to FIG. 7, part of a wireless communication system 1300 is shown in outline, in accordance with one example embodiment of the invention. In this example embodiment, the wireless communication system 1300 is compliant with, and contains network elements capable of operating over, a 5th generation (5G) wireless communication system, which is currently under discussion in the third Generation Partnership Project (3GPP™) specification for 5G, based around Orthogonal Frequency Division Multiple Access (OFDMA) in the downlink (DL) and DFT-spread OFDM (DFT-s-OFDM) in the uplink (UL), as described in the 3GPP™ TS 38.211 series of specifications.

The wireless communication system 1300 architecture consists of radio access network (RAN) and core network (CN) elements (not shown), with the core network elements being coupled to external networks (named Packet Data Networks (PDNs)), such as the Internet or a corporate network.

As illustrated, the CN is operably connected to two gNodeBs (gNBs) 310, 312, with a respective, substantially-identical, coverage area or cell 1385. A plurality of wireless communication units 1325 communicate with a serving gNB 1310. In accordance with example embodiments of the present invention, at least one gNB 1310 and at least one UE 1325 (amongst other elements) have been adapted to support the concepts hereinafter described.

In this example of the invention, the main component of the RAN is an NTN airborne gNB 1310, which performs many standard base station functions and is connected to the CN via an S1 interface/feeder link and to the wireless communication units 1325 via a Uu interface. A wireless communication system will typically have a large number of such infrastructure elements where, for clarity purposes, only a limited number are shown in FIG. 7. The gNB 1310 control and manage the radio resource related functions for a plurality of remote wireless communication units 1325. Each of the wireless communication units 1325 comprise a transceiver unit 1327 operably coupled to signal processing logic 1308 (with one wireless communication unit illustrated in such detail for clarity purposes only). The system comprises many other remote wireless communication units 1325 and gNBs 1310, which for clarity purposes are not shown.

Notably, in accordance with some example embodiments, the system determines that the NTN airborne gNB 1310 needs to be replaced, e.g. for regular maintenance, or due to battery power, etc. In this regard, an NTN airborne replacement gNB 1312 needs to be positioned physically close to the serving NTN airborne gNB 1310, in order to serve the same set of UEs 1325 in the same cell 1385. Thus, in examples of the invention, the NTN airborne replacement gNB 1312 is configured to operate at a second frequency that is a different frequency than a first frequency that the current serving NTN airborne gNB 1310 uses, and the handover(s) that follow are configured to be inter-frequency handovers.

After the NTN airborne replacement gNB 1312 positions itself close to the serving NTN airborne gNB 1310, the NTN airborne replacement gNB 1312 is configured first to establish the backhaul link to the core network. In examples of the invention, the NTN airborne replacement gNB 1312 will be granted a cell ID and operational parameters, such as the carrier frequency and serving bandwidth by the core network. Then, the NTN airborne replacement gNB 1312 is configured to establish the X2 (wireless) link 1330 with the current serving NTN airborne gNB 1310. Once these setup procedures are complete, the NTN airborne replacement gNB 1312 is configured to start to broadcast its parameters and synchronisation signals within the coverage area 1385 of its new cell (which is nearly identical to the existing served cell by the other gNB).

The NTN airborne replacement gNB 1312 includes a transceiver and a processor that is arranged to establish a wireless backhaul or front-haul communication link with the first base station, i.e. the serving NTN airborne gNB 1310. The NTN airborne replacement gNB 1312 is configured to broadcast a transmission to the plurality of remote wireless communication units, e.g. UEs 1325, on the second frequency that is different to a first frequency (used by the first base station, i.e. the serving NTN airborne gNB 1310. The broadcast transmission from the NTN airborne replacement gNB 1312 includes at least one cell identifier parameter; and at least one synchronization signal, so that each of the UEs 1325 are able to recognise the existence of the NTN airborne replacement gNB 1312. As the NTN airborne replacement gNB 1312 is positioned close to the serving NTN airborne gNB 1310, the broadcast transmissions of each cover substantially the same coverage area 1385, as shown.

The first base station, i.e. the serving NTN airborne gNB 1310, also includes a transceiver and a processor, which is arranged to broadcast an inter-frequency measurement report request on the first frequency to the plurality of remote wireless communication units. served by the first base station. Notably, the measurement report request includes measurements for the second frequency used by the NTN airborne replacement gNB 1312 that the UEs now recognise.

In this manner, the serving NTN airborne gNB 1310 is able to obtain inter-frequency measurement reports from its served remote wireless communication units (e.g. UEs 1325) and, say, initiate a handover operation when they are in a radio resource controlled (RRC)-connected state. Thus, in some examples of the invention, a mechanism for provision of signalling procedures can support a group handover scenario in an airborne NTN base station (or gNB) for the RRC-connected state UEs.

In examples of the invention, the handover process may encompass the serving gNB 1310 issuing a handover command to the UE 1325, once the target gNB 1312 agrees to the handover. The serving gNB 1310 will then start to push all of the unacknowledged packets to the target gNB 1312 through the X2 link 1330. The UE 1325 performs uplink synchronisation to the target gNB 1312 and may also obtain resource access through, say, a contention free random access channel (RACH) procedure. In some examples, the UE 1325 may also send a handover complete message to the target gNB 1312, effectively making it the new serving gNB.

At this point, the new serving eNB will inform the core network of the handover complete and a late path switch occurs, so that the all packets (concerning the active UE 1325) are now routed to the new serving gNB, i.e. NTN airborne replacement gNB 1312 in this example.

In some optional examples, for example in the illustrated 5G system, the remote wireless communication units (e.g. UEs 1325), when they are in a RRC-inactive state, may be able to initiate a cell re-selection procedure in response to the conducted measurements.

In some examples, it is envisaged that the new broadcast signalling message transmitted by the serving NTN airborne gNB 1310 may be configured as part of the System Information Block (SIB). In some examples, this new SIB message may be configured in ways that only the NTN connected UEs 1325 would be able to read. For example, this new SIB message may be configured with a binary header bit, and when active can indicate to the NTN connected UE's 1325 to read-on for the full message.

In an alternative example of the invention, a front-haul link may be formed, for example in a case where a centralized BBU processing network 1350 (sometimes referred to as a fully centralized radio access network (RAN)) is used. Here, in this example, the NTN airborne gNB 1310 and the NTN airborne replacement gNB 1312 the may be configured as simple remote radio heads (RRH) carrying out only the transceiver RF functions, while the higher layer RAN operations can be carried out in a centralized processing unit 1358 operably and wirelessly connected to the RRHs via a respective transceiver 1357. In this example, the centralized BBU processing network 1350 is preferably based on the ground. This optional implementation much simplifies the design and reduces power consumption of the air-borne (NTN) part of the network, thereby allowing longer operational times before replacement due to battery drain or maintenance reasons. The communications between the RRHs and the centralized processing unit happens through the front-haul links 1352. In this configuration the handover and cell re-selection options are physically carried out in the centralized processing unit 1358, in response to the signalling procedures between RRH and the UEs based on the broadcast inter-frequency message report request and reports sent in response thereto.

In a further envisaged optional example of the invention, the processor centralization may be carried out partially in a centralized BBU processing network 1350 and partially in the NTN airborne gNB 1310 and the NTN airborne replacement gNB 1312. Thus, operations and any intermediate steps (as described below) may be distributed there between.

Figure 8:
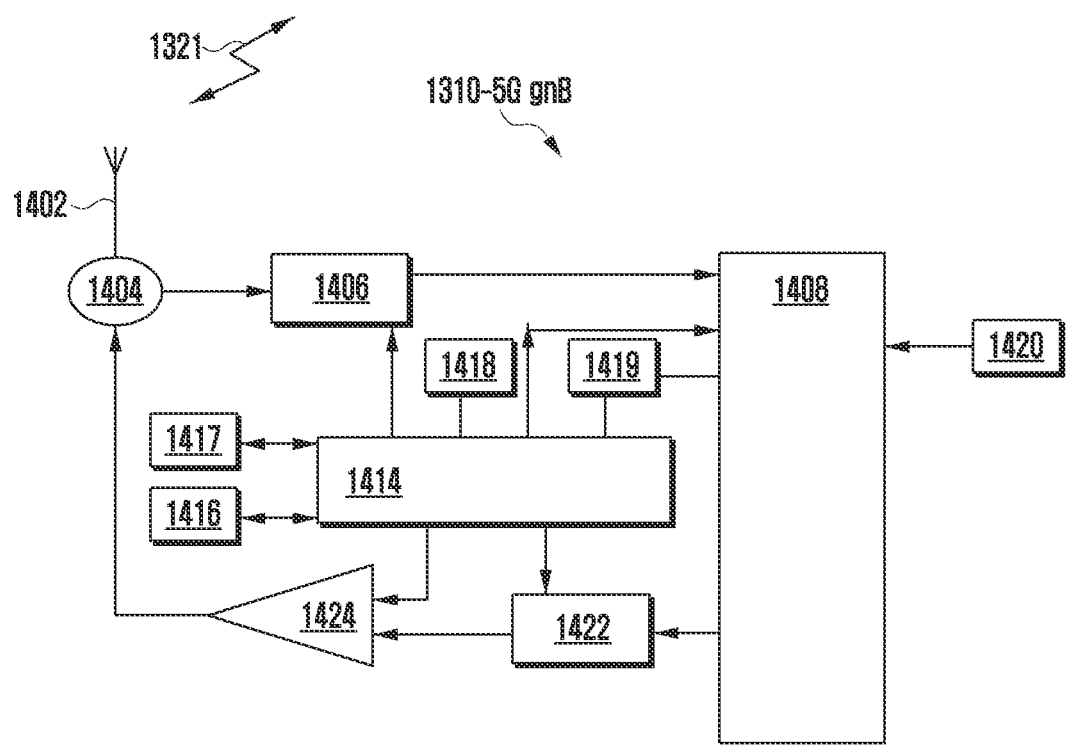
FIG. 8 illustrates a block diagram of an NTN base station communicating with a UE, adapted in accordance with some example embodiments of the invention.
Figure 8:
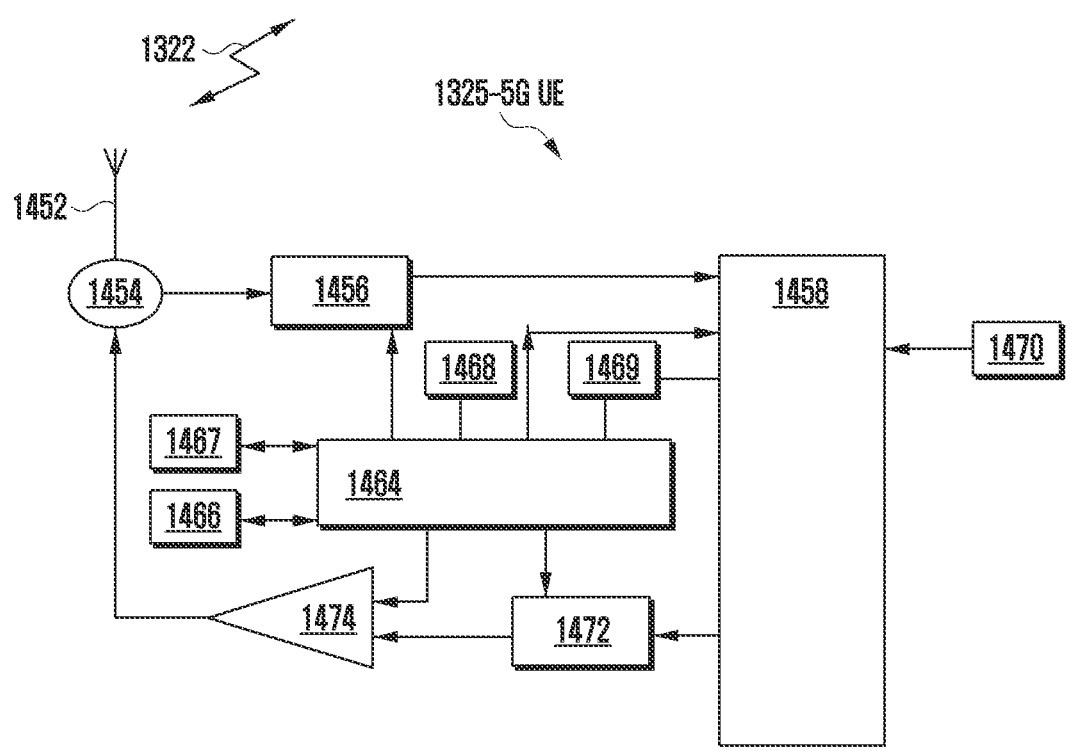

Referring now to FIG. 8, more detailed block diagrams of a gNB wireless base station 1310 (equivalent in functionality details to gNB wireless base station 1312 in FIG. 3) and a remote wireless communication unit (such as a UE 1325) are illustrated, where the respective communications units have been adapted in accordance with some example embodiments of the invention.

The gNB wireless base station 1310 contains an antenna 1402, for receiving transmissions, coupled to an antenna switch or duplexer 1404 that provides isolation between receive and transmit chains within the gNB wireless base station 1310. One or more receiver chains, as known in the art, include receiver front-end circuitry 1406 (effectively providing reception, filtering and intermediate or base-band frequency conversion). The receiver front-end circuitry 1406 is coupled to a signal processing module 1408 (generally realized by a digital signal processor (DSP)). A skilled artisan will appreciate that the level of integration of receiver circuits or components may be, in some instances, implementation-dependent.

The controller 1414 maintains overall operational control of the gNB wireless base station 1310. The controller 1414 is also coupled to the receiver front-end circuitry 1406 and the signal processing module 1408. In some examples, the controller 1414 is also coupled to a frequency generation circuit 1417 and a memory device 1416 that selectively stores operating regimes, such as decoding/encoding functions, synchronization patterns, code sequences, and the like. A timer 1418 is operably coupled to the controller 1414 to control the timing of operations (e.g. transmission or reception of time-dependent signals) within the gNB wireless base station 1310.

As regards the transmit chain, this essentially includes an input module 1420, coupled in series through transmitter/modulation circuitry 1422 and a power amplifier 1424 to the antenna 1402, antenna array, or plurality of antennas. The transmitter/modulation circuitry 1422 and the power amplifier 1424 are operationally responsive to the controller 1414. The signal processor module 1408 in the transmit chain may be implemented as distinct from the signal processor in the receive chain. Alternatively, a single processor may be used to implement a processing of both transmit and receive signals, as shown in FIG. 8. Clearly, the various components within the gNB wireless base station 1310 can be realized in discrete or integrated component form, with an ultimate structure therefore being an application-specific or design selection.

The processor 1408 and transceiver (e.g. transmitter/modulation circuitry 1422 and receiver front-end circuitry 1406) of the gNB wireless base station 1310 establish a wireless backhaul or front-haul communication link with a second replacement base station, e.g. gNB wireless base station 1312 in FIG. 7). The gNB wireless base station 1310 operates at a first frequency that is set by frequency generation circuit 1417 and that is different to a second frequency used by the second replacement base station. The processor 1408 and transmitter/modulation circuitry 1422 are configured to broadcast an inter-frequency measurement report request on the first frequency to a plurality of remote wireless communication units 1325 served by the gNB wireless base station 1310, wherein the measurement report request includes a request for signal strength measurements for the second frequency. The receiver front-end circuitry 1406 and processor 1408 then receive the reported measurement reports from the served UEs 1325.

In some examples, the inter-frequency measurement report request includes a measurement threshold configured to trigger the remote wireless communication units performing and reporting the measurement in response to a signal strength from the second base station (e.g. gNB wireless base station 1312) being ΔdB higher than a measured signal strength of the first base station. In some examples, the measurement threshold may be configured to be a minimum ΔdB threshold between signal strengths from the gNB wireless base station 1310 and the second base station (e.g. gNB wireless base station 1312).

In some examples, for a handover process, once the measurements are provided to the processor 1408, and if the signal from the neighbour gNB (e.g. gNB wireless base station 1312) has sufficient signal strength (for example as determined by the threshold Δ dB) the serving gNB initiates the handover, for example in the known manner. In some examples, as the UEs may be responding in an RRC-connected state (i.e. the UEs are actively communicating data with another UE or a packet data network (PDN)), the gNB wireless base station 1310 may initiate a substantially simultaneous handover of a group of UEs. In this example, the substantially simultaneous handover of a group of UEs is dependent on the respective measurement reports, as the handovers are governed by the measurements the UE 1325 makes of the serving/camped-on and neighbour cells.

FIG. 8 also shows a high level block diagram of the wireless communication unit 1325 contains an antenna 1452, for receiving transmissions, coupled to an antenna switch or duplexer 1454 that provides isolation between receive and transmit chains within the wireless communication unit 1325. One or more receiver chains, as known in the art, include receiver front-end circuitry 1456 (effectively providing reception, filtering and intermediate or base-band frequency conversion). The receiver front-end circuitry 1456 is coupled to a signal processing module 1458 (generally realized by a digital signal processor (DSP)). A skilled artisan will appreciate that the level of integration of receiver circuits or components may be, in some instances, implementation-dependent.

The controller 1464 maintains overall operational control of the wireless communication unit 1325. The controller 1464 is also coupled to the receiver front-end circuitry 1456 and the signal processing module 1458. In some examples, the controller 1464 is also coupled to a frequency generation circuit 1467 and a memory device 1466 that selectively stores operating regimes, such as decoding/encoding functions, synchronization patterns, code sequences, and the like. A timer 1468 is operably coupled to the controller 1464 to control the timing of operations (e.g. transmission or reception of time-dependent signals) within the wireless communication unit 1325.

As regards the transmit chain, this essentially includes an input module 1470, coupled in series through transmitter/modulation circuitry 1472 and a power amplifier 1474 to the antenna 1452, antenna array, or plurality of antennas. The transmitter/modulation circuitry 1472 and the power amplifier 1474 are operationally responsive to the controller 1464.

The signal processor module 1458 in the transmit chain may be implemented as distinct from the signal processor in the receive chain. Alternatively, a single processor may be used to implement a processing of both transmit and receive signals, as shown in FIG. 8. Clearly, the various components within the wireless communication unit 1325 can be realized in discrete or integrated component form, with an ultimate structure therefore being an application-specific or design selection.

The processor 1458 and transceiver (e.g. transmitter/modulation circuitry 1472 and receiver front-end circuitry 1456) of the UE 1325 are configured to communicate with the gNB wireless base station 1310 on a first frequency that is set by frequency generation circuit 1467. In accordance with examples of the invention, the frequency generation circuit 1467 may also configure the UE 1325 to operate on a second frequency so that it can receive at least one cell identifier parameter and at least one synchronization signal, from the replacement gNB 1312, which may be an airborne gNB, to enable the UE 1325 to recognise the existence of the NTN airborne replacement gNB 1312 as a prospective candidate base station. The second frequency is different to the first frequency used by the serving base station (i.e. gNB wireless base station 1310). The processor 1458 and receiver front-end circuitry 1406 are configured to receive a broadcast inter-frequency measurement report request on the first frequency from the gNB wireless base station 1310, wherein the measurement report request includes a request for signal strength measurements for the second frequency that the NTN airborne replacement gNB 1312 is using. Once signal strength measurements on the requested frequencies have been performed by the UE 1325, the transmitter/modulation circuitry 1422 and processor 1408 then transmit the reported measurement reports to the gNB wireless base station 1310.

In some examples, when the UE 1325 is in a radio resource controlled (RRC)-inactive state (e.g. where the UEs have minimal signalling with the base station and can transmit sporadic, short packets), the processor 1458 may be configured to initiate a cell re-selection procedure to the second replacement base station in response to the conducted measurements. Again, in this example, the cell re-selection procedure is governed by the measurements that the UE 1325 makes of the serving/camped-on and neighbour cells.

In some examples, for example in an RRC-idle state (e.g. where the UEs are not performing any data communication), the UE 1325 is able to conduct these measurements periodically at a rate that it has configured or the serving/camped-on gNB can instruct the UEs to provide these measurements. For this example cell re-selection procedure, once the measurements are conducted by the UE 1325 and if the neighbour gNB 1321 has sufficient signal strength (as determined by the threshold $\Delta$ dB), the UE 1325 may itself initiate the process.

In a further aspect of the invention, it is noted that the standardization of a 5G new radio (NR) has introduced a new radio resource control (RRC) state, termed RRC-inactive, which is targeted towards reducing the energy consumption (through reduced signalling) and to reduce the delays in short packet transmissions. This new RRC state will lie between the traditional RRC-connected (active UEs, which have been described above within the context of a group handover) and the RRC-idle states. This new RRC state is designed mainly to support short and infrequent transmissions in MTC type applications. The inventors of the present invention believe that the new RRC state may be ideally suited to the air-borne platforms, particularly in supporting many such remote MTC applications in future, due to better coverage and infrequent use.

It is envisaged that some of the MTC devices communicating with such an airborne NTN gNB will engage in sporadic short packet transmissions and, thus, stay in the RRC-inactive state for a long time. Within this RRC-inactive state, the serving gNB will have minimum signalling with such devices. When the serving gNB needs to be replaced by a new airborne gNB, it is envisaged in some examples that all such RRC-inactive devices may be configured to carry out a cell re-selection process.

Normally the cell re-selection process is enacted by the periodic measurements the remote device is making. Typically, if the remote device finds that the current cell on which it is camping (i.e. its host) has a lower signal strength (e.g. lower by a $\Delta$ dB threshold) than a neighbour cell, the remote device will try to camp on the neighbour cell. However, it is envisaged that if the serving gNB (e.g. host cell) has sufficient signal strength, these periodic, infrequent measurements may be carried out with much less frequency.

Thus, in some examples of the invention, a mechanism is described to alert all these remote MTC devices in the RRC-inactive state, in order to carry out these neighbour cell measurements and subsequently initiate the cell re-selection process.

For these MTC remote devices, it is envisaged that a group 'cell re-selection' process may be activated, once the replacement NTN gNB is in place and has broadcasted its cell ID etc. In this context, in accordance with examples of the invention, the serving NTN gNB may be configured to prompt the cell re-selection process for the remote MTC devices by sending a broadcast message as previously described. Although considered outside of the scope of the present invention, in some implementations there may be changes in other RAN operations (such as RACH pre-amble configuration) for the NTN connected UEs and devices. Hence, in some examples, it is reasonable to assume that the UE/device will be made aware when it connects to an NTN cell. In some examples, the SIB message itself can instruct RRC-inactive UE's to carry out inter-frequency neighbour measurements (with no threshold offset). Once these measurements are conducted, this will be followed by the cell re-selection procedure. Examples of the invention may be configured as a part of RRC configuration, and thus may be software configurable.

Figure 9:
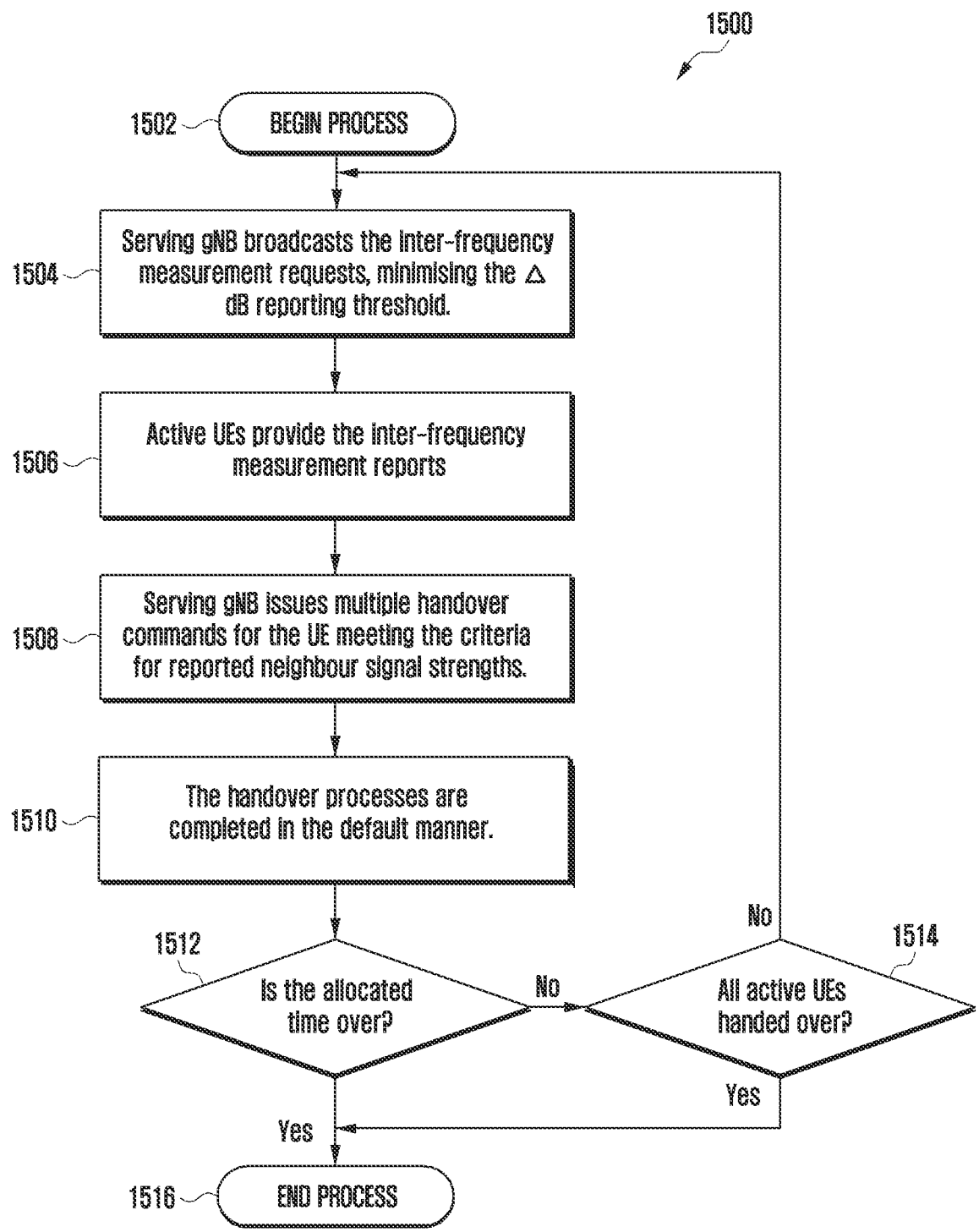
FIG. 9 illustrates a simplified flowchart of an NTN base station group handover operation, in accordance with some example embodiments of the invention.

Referring now to FIG. 9 a simplified flowchart 1500 of an NTN base station group handover operation is illustrated, in accordance with some example embodiments of the invention. The flowchart starts at 1502 and, at 1504, a serving NTN gNB is configured to broadcast an inter-frequency measurement request. In some examples, the inter-frequency measurement request is broadcast with a reduced or minimized $\Delta$ dB reporting threshold so that the handover operation can be triggered proactively for a group of UEs. An extreme case is when $\Delta=0$ dB where all UEs will perform handover. At 1506, the active UEs and IoT devices provide the inter-frequency measurement reports in response to the broadcast request. At 1508, the serving gNB then issues multiple handover commands for all UEs and IoT devices that meet the criteria, e.g., the measured signal strength difference between serving gNB and target gNB is higher than $\Delta$ dB reporting threshold, for the reported neighbour signal strengths. At 1510, the handover processes are then completed in the default manner.

In some examples, although the handover operation is performed on an individual UE (e.g. remote wireless communication unit) basis, it is envisaged that the handover may be triggered for a group of UEs to perform a simultaneous handover operation. At 1512, a determination is made as to whether the allocated time for performing all handovers has finished. If the allocated time for performing all handovers in 1512 has finished, then the process ends at 1516. However, if the allocated time for performing all handovers has not finished in 1512, a determination is made at 1514 as to whether all active UEs (and IoT devices) have been handed over to the replacement NTN gNB. If all active UEs (and IoT devices) have been handed over to the replacement NTN gNB in 1514, the process ends at 1516. However, if all active UEs (and IoT devices) have not been handed over to the replacement NTN gNB in 1514, the flowchart loops back to 1504.

Figure 10:
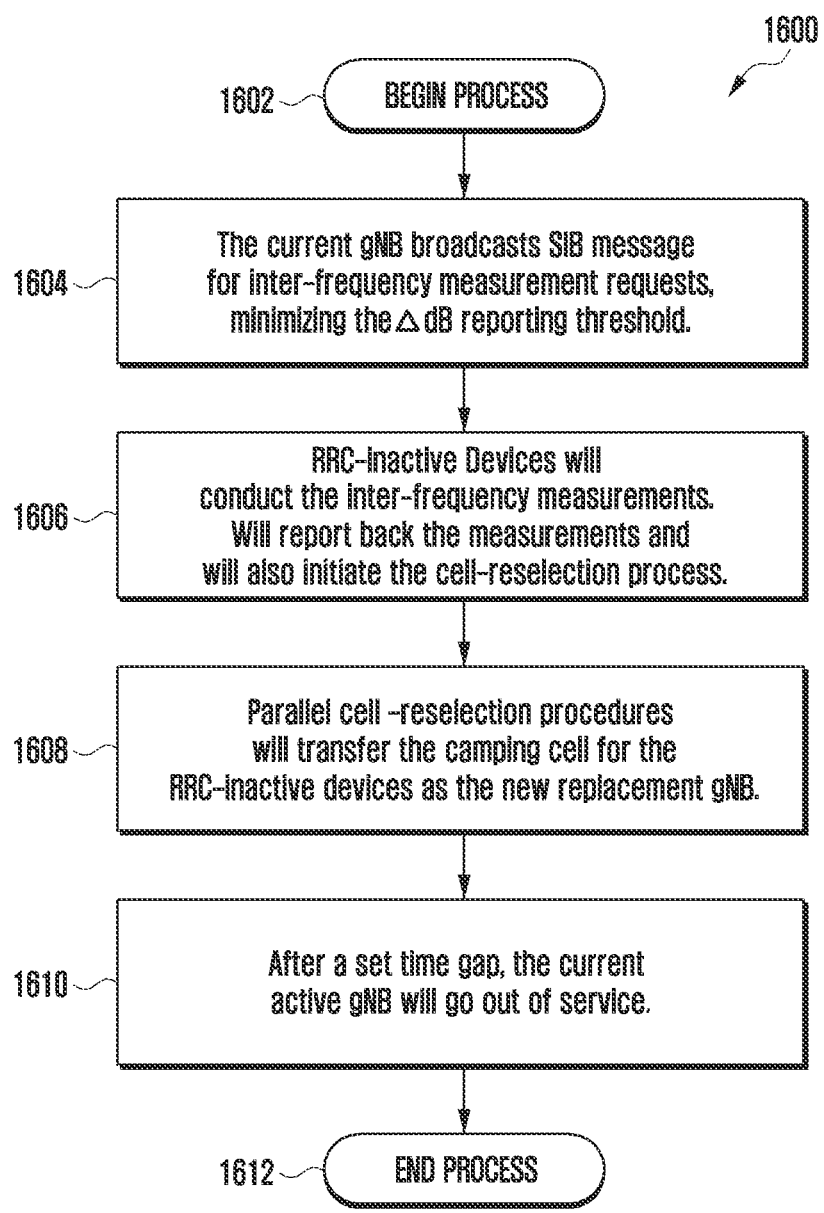
FIG. 10 illustrates a simplified flowchart of an NTN base station group cell reselection operation, in accordance with some example embodiments of the invention.

Referring now to FIG. 10 a simplified flowchart 1600 of an NTN base station group cell re-selection operation is illustrated, in accordance with some example embodiments of the invention. The flowchart starts at 1602 and, at 1604, a serving NTN gNB is configured to broadcast an SIB message for a request for inter-frequency measurement reports. In some examples, the inter-frequency measurement request is broadcast with a reduced or minimized $\Delta$ dB reporting threshold. At 1606, RRC-inactive devices are configured to conduct the inter-frequency measurements and report back to the serving NTN gNB. In accordance with examples of the invention, at 1606, the RRC-inactive devices are also configured to initiate a cell re-selection process. At 1608, one or more other cell re-selection procedures are performed in parallel, thereby transferring the camping cell (serving NTN gNB) for the RRC-inactive devices to the replacement NTN gNB. Once the RRC-inactive devices have been transferred to the replacement NTN gNB, and a suitable time gap has elapsed, the current (now previous) serving gNB will be placed out of service at 1610. The flowchart then ends at 1612.

In particular, it is envisaged that the aforementioned inventive concept can be applied by a semiconductor manufacturer to any integrated circuit comprising a signal processor configured to perform any of the aforementioned operations. Furthermore, the inventive concept can be applied to any circuit that is able to configure, process, encode and/or decode signals for wireless distribution. It is further envisaged that, for example, a semiconductor manufacturer may employ the inventive concept in a design of a stand-alone device, such as a digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the signal processor may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Thus, communication units such as NTN airborne gNBs and terminal devices, a communication system and methods relating to group handover for terminal devices such as UEs or IoT devices have been described, wherein the aforementioned disadvantages with prior art arrangements have been substantially alleviated. Furthermore, communication units such as NTN airborne gNBs and terminal devices, a communication system and methods relating to cell reselection for RRC inactive terminal devices such as UEs or IoT devices have been described, wherein the aforementioned disadvantages with prior art arrangements have been substantially alleviated It will be appreciated that certain embodiments of the present invention may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain embodiments of the present invention. Accordingly, certain embodiments provide a program comprising code for implementing a method, apparatus or system as claimed in any one of the claims of this specification, and a machine-readable storage storing such a program. Still further, such programs may be conveyed electronically via any medium, for example a communication signal carried over a wired or wireless connection, and embodiments suitably encompass the same.

While the invention has been shown and described with reference to certain embodiments thereof, it will be understood by those skilled in the art that various changes in form and detail may be made therein without departing from the scope of the invention, as defined by the appended claims. Furthermore, equivalents and modifications not described above may also be used without departing from the scope of the invention, which is defined in the accompanying claims.

The invention claimed is:

1. A method of operating a mobile terminal in a wireless communications network, the mobile terminal being arranged to communicate with a base station, the method comprising:
   determining a cause of a Random Access procedure initiation, based on beam failure, following initiation of a Random Access procedure;
   determining one or more transmission priority factors indicating an operating parameter of the wireless communications network; and
   based on one or more of the determined cause of the Random Access procedure initiation and the determined one or more transmission priority factors, performing at least one of:
      prioritising a Random Access signal transmission over a signal transmission on an uplink shared channel,
      prioritising the signal transmission on the uplink shared channel over the Random Access signal transmission, or
      making no change to an existing signal transmission protocol,
   wherein if a Type of Configured Grant signal transmissions is Type 1, Configured Grant signal transmission is prioritised over the Random Access signal transmission, and wherein if the Type of Configured Grant signal transmissions is Type 2, the Random Access signal transmission is prioritised over Configured Grant signal transmission.

2. The method according to claim 1, wherein the mobile terminal is configured to communicate with the base station using one or more of:
 4G wireless communications, and
 5G wireless communications.

3. The method according to claim 1, wherein the one or more transmission priority factors indicating an operating parameter of the wireless communications network comprise one or more of:
 traffic carried on the uplink shared channel signal transmissions,
 a Type of Configured Grant signal transmissions,
 a past frequency of beam failures,
 a past number of beam failures,
 a time between consecutive uplink shared channel signal retransmissions,
 link quality,
 a likelihood of beam failure,
 a likelihood of link failure, and
 a resulting or impending topology change.

4. The method according to claim 1,
 wherein the prioritising of the Random Access signal transmission over the signal transmission on the uplink shared channel comprises transmitting a Random Access signal instead of transmitting a signal on the uplink shared channel when the Random Access signal transmission and the signal transmission on the uplink shared channel clash in time, and
 wherein the prioritising of the signal transmission on the uplink shared channel over the Random Access signal transmission comprises transmitting the signal on the uplink shared channel instead of transmitting the Random Access signal when the Random Access signal transmission and the signal transmission on the uplink shared channel clash in time.

5. The method according to claim 1,
 wherein the prioritising of the Random Access signal transmission over the signal transmission on the uplink shared channel comprises overwriting data to be transmitted on the uplink shared channel with data to be transmitted in the Random Access signal transmission when the data to be transmitted in the Random Access signal transmission and the data to be transmitted on the uplink shared channel coincide so as to share a same buffer space,
 wherein the prioritising of the signal transmission on the uplink shared channel over the Random Access signal transmission comprises overwriting data to be transmitted in the Random Access signal transmission with data to be transmitted on the uplink shared channel when the data to be transmitted in the Random Access signal transmission and the data to be transmitted on the uplink shared channel coincide so as to share the same buffer space,
 wherein a buffer space is in a hybrid automatic repeat request (HARQ) buffer of process ID 0,
 wherein the data to be overwritten is stored in the HARQ buffer of process 0, and
 wherein the overwriting of the data comprises overwriting the data stored in the HARQ buffer of process 0 with one or more of:
  data stored in a Message 3 buffer, and
  data scheduled to be transmitted on the uplink shared channel.

6. The method according to claim 1, wherein a Random Access data comprises Message 3 data.

7. The method according to claim 1, wherein the determining of the cause of the Random Access procedure initiation comprises determining that beam failure has occurred.

8. The method according to claim 1, further comprising:
 performing the prioritising of the Random Access signal transmission over the signal transmission on the uplink shared channel when the cause of the Random Access procedure initiation comprises beam failure.

9. The method according to claim 1,
 wherein the determining of the cause of the Random Access procedure initiation comprises determining a lack or unavailability of Physical Uplink Control Channel resources on a single Scheduling Request configuration, and
 wherein the prioritising of the Random Access signal transmission over the signal transmission on the uplink shared channel when the cause of the Random Access procedure initiation comprises a lack or unavailability of Physical Uplink Control Channel resources on a single Scheduling Request configuration.

10. The method according to claim 1, wherein the prioritising of the Random Access signal transmission over the signal transmission on the uplink shared channel is performed by starting or restarting a configuredGrantTimer for a hybrid automatic repeat request (HARQ) process corresponding to the Random Access signal transmission.

11. A method of operating a base station in a wireless communications network, the base station being arranged to communicate with a mobile terminal, the method comprising:
 determining a cause of a Random Access procedure initiation, based on beam failure, following initiation of a Random Access procedure;
 determining one or more transmission priority factors indicating an operating parameter of the wireless communications network;
 receiving, from the mobile terminal, an indication of a cause of the Random Access procedure initiation following initiation of a Random Access procedure;
 receiving, from the mobile terminal, an indication of one or more transmission priority factors indicating an operating parameter of the wireless communications network;
 based on the one or more determined causes, determined transmission priority factors, and received indications, determining a prioritisation action for the mobile terminal to perform from:
  prioritising Random Access signal transmission over signal transmission on an uplink shared channel,
  prioritising the signal transmission on the uplink shared channel over the Random Access signal transmission, or
  making no change to an existing signal transmission protocol; and
 providing an indication of the prioritisation action to the mobile terminal,
 wherein if a Type of Configured Grant signal transmissions is Type 1, Configured Grant signal transmission is prioritised over the Random Access signal transmission, and wherein if the Type of Configured Grant signal transmissions is Type 2, the Random Access signal transmission is prioritised over Configured Grant signal transmission.

12. A mobile terminal in a wireless communications network, the mobile terminal comprising:
a transceiver configured to transmit and receive signals to and from a base station; and
a controller connected to the transceiver and configured to:
determine a cause based on beam failure of a Random Access procedure initiation, based on beam failure, following initiation of a Random Access procedure, and
determine one or more transmission priority factors indicating an operating parameter of the wireless communications network, and
based on one or more of the determined cause of Random Access procedure initiation and the determined one or more transmission priority factors, perform one of:
prioritize Random Access signal transmission over signal transmission on an uplink shared channel,
prioritize the signal transmission on the uplink shared channel over the Random Access signal transmission, or
make no change to an existing signal transmission protocol,
wherein if a Type of Configured Grant signal transmissions is Type 1, Configured Grant signal transmission is prioritised over the Random Access signal transmission, and
wherein if the Type of Configured Grant signal transmissions is Type 2, the Random Access signal transmission is prioritised over Configured Grant signal transmission.

13. The mobile terminal according to claim 12, wherein the mobile terminal is configured to communicate with the base station using one or more of:
4G wireless communications, and
5G wireless communications.

14. A base station in a wireless communications network, the base station comprising:
a transceiver configured to transmit and receive signals to and from a mobile terminal; and
a controller connected to the transceiver and configured to:
determine a cause of a Random Access procedure initiation, based on beam failure, following initiation of a Random Access procedure,
determine one or more transmission priority factors indicating an operating parameter of the wireless communications network,
receive, from the mobile terminal, an indication of a cause of the Random Access procedure initiation following initiation of a Random Access procedure,
receive, from the mobile terminal, an indication of one or more transmission priority factors indicating an operating parameter of the wireless communications network,
based on the one or more determined causes, determined transmission priority factors, and received indications, determine a prioritization action for the mobile terminal to perform from:
prioritize Random Access signal transmission over signal transmission on an uplink shared channel,
prioritize the signal transmission on the uplink shared channel over the Random Access signal transmission, or
make no change to an existing signal transmission protocol, and
provide an indication of the prioritisation action to the mobile terminal,
wherein if a Type of Configured Grant signal transmissions is Type 1, Configured Grant signal transmission is prioritised over the Random Access signal transmission, and
wherein if the Type of Configured Grant signal transmissions is Type 2, the Random Access signal transmission is prioritised over Configured Grant signal transmission.

* * * * *